United States Patent
Hulbert et al.

(10) Patent No.: US 11,883,703 B2
(45) Date of Patent: Jan. 30, 2024

(54) LONG-TERM FIRE RETARDANT WITH MAGNESIUM SULFATE AND CORROSION INHIBITORS AND METHODS FOR MAKING AND USING SAME

(71) Applicant: FRS Group, LLC, Rocklin, CA (US)

(72) Inventors: Dennis Hulbert, Corvallis, MT (US); Robert J. Burnham, Stevensville, MT (US); Michael S. Schnarr, Roseville, CA (US); Gerald Geissler, Kailua-Kona, HI (US); David W. Wilkening, Ronan, MT (US); Joseph McLellan, Rocklin, CA (US)

(73) Assignee: FRS Group, LLC, Rocklin, CA (US)

( * ) Notice: Subject to any disclaimer, the term of this patent is extended or adjusted under 35 U.S.C. 154(b) by 0 days.

(21) Appl. No.: 18/182,198

(22) Filed: Mar. 10, 2023

(65) Prior Publication Data

US 2023/0211199 A1    Jul. 6, 2023

Related U.S. Application Data

(63) Continuation of application No. 17/845,569, filed on Jun. 21, 2022, now Pat. No. 11,602,658, which is a
(Continued)

(51) Int. Cl.
*A62D 1/00* (2006.01)
*A62C 3/02* (2006.01)
*C01F 5/40* (2006.01)

(52) U.S. Cl.
CPC ............... *A62D 1/005* (2013.01); *A62C 3/02* (2013.01); *A62D 1/0007* (2013.01); *A62D 1/0035* (2013.01); *C01F 5/40* (2013.01)

(58) Field of Classification Search
CPC .... A62D 1/005; A62D 1/0007; A62D 1/0035; A62C 3/02; C01F 5/40; C09K 21/04
See application file for complete search history.

(56) References Cited

U.S. PATENT DOCUMENTS

| | | |
|---|---|---|
| 2,759,924 A | 8/1956 | Touey |
| 2,990,233 A | 6/1961 | Eugene et al. |
| | (Continued) | |

FOREIGN PATENT DOCUMENTS

| | | |
|---|---|---|
| AU | 2018435573 A1 | 3/2021 |
| CA | 2494914 A1 | 2/2004 |
| | (Continued) | |

OTHER PUBLICATIONS

International Search Report in International Patent Application No. PCT/US2021/047726 dated Feb. 3, 2022, 21 pages.
(Continued)

*Primary Examiner* — Andrew J. Oyer
(74) *Attorney, Agent, or Firm* — Smith Baluch LLP

(57) ABSTRACT

A forest fire retardant composition contains a retardant compound that includes a halide salt, a non-halide salt, a metal oxide, a metal hydroxide, a sulfate salt, or combinations thereof. The forest fire retardant composition may include at least one anhydrous salt and at least one hydrate salt. The sulfate salt may be magnesium sulfate. The magnesium sulfate hydrate has a formula $MgSO_4(H_2O)_x$, where x is about 1 to about 11. For example, x may be equal to at least one of 1, 2, 3, 4, 5, 6, 7, 9, 10 or 11. The composition may be in the form of a dry concentrate, a liquid concentrate, or a final diluted product. The final diluted product is effective in suppressing, retarding, and controlling forest fires while exhibiting corrosion resistance and low toxicity.

20 Claims, 11 Drawing Sheets

Related U.S. Application Data continuation of application No. 17/458,002, filed on Aug. 26, 2021, now Pat. No. 11,395,934.

(60) Provisional application No. 63/140,657, filed on Jan. 22, 2021, provisional application No. 63/125,693, filed on Dec. 15, 2020.

(56) References Cited

U.S. PATENT DOCUMENTS

| | | | |
|---|---|---|---|
| 3,223,649 | A | 12/1965 | Langguth |
| 3,274,105 | A | 9/1966 | Norbert |
| 3,275,566 | A | 9/1966 | Langguth |
| 3,293,189 | A | 12/1966 | Morgenthaler |
| 3,338,829 | A | 8/1967 | Langguth et al. |
| 3,342,749 | A | 9/1967 | Handleman et al. |
| 3,350,305 | A | 10/1967 | Langguth et al. |
| 3,364,149 | A | 1/1968 | Morgenthaler |
| 3,382,186 | A | 5/1968 | Silverstein |
| 3,409,550 | A | 11/1968 | Gould |
| 3,585,135 | A | 6/1971 | Smith et al. |
| 3,843,525 | A | 10/1974 | Hattori et al. |
| 4,134,876 | A | 1/1979 | Horner et al. |
| 4,134,959 | A | 1/1979 | Menke et al. |
| 4,145,296 | A | 3/1979 | Fox et al. |
| 4,168,239 | A | 9/1979 | Mertz et al. |
| 4,176,071 | A | 11/1979 | Crouch |
| 4,343,854 | A | 8/1982 | Moorman |
| 4,374,171 | A | 2/1983 | McCarter |
| 4,392,994 | A | 7/1983 | Wagener |
| 4,770,794 | A | 9/1988 | Cundasawmy et al. |
| 4,950,410 | A | 8/1990 | Pennartz |
| 4,983,326 | A | 1/1991 | Vandersall |
| 5,009,710 | A | 4/1991 | Bewsey |
| 5,596,029 | A | 1/1997 | Goebelbecker et al. |
| 5,849,210 | A | 12/1998 | Pascente et al. |
| 5,985,013 | A | 11/1999 | Kofler et al. |
| 6,019,176 | A | 2/2000 | Crouch |
| 6,162,375 | A | 12/2000 | Crouch et al. |
| 6,296,781 | B1 | 10/2001 | Amiran |
| 6,447,697 | B1 | 9/2002 | Vandersall |
| 6,517,747 | B2 | 2/2003 | Vandersall |
| 6,802,994 | B1 | 10/2004 | Kegeler et al. |
| 6,858,567 | B2 | 2/2005 | Akao |
| 7,115,677 | B2 | 10/2006 | Harashina et al. |
| 7,794,688 | B2 | 9/2010 | Caine et al. |
| 8,212,073 | B2 | 7/2012 | Kasowski |
| 8,366,955 | B2 | 2/2013 | Thomas et al. |
| 8,871,058 | B2 | 10/2014 | Sealey et al. |
| 9,919,174 | B2 | 3/2018 | Vellmar |
| 9,982,195 | B2 | 5/2018 | Matsui |
| 10,550,483 | B2 | 2/2020 | Khosla et al. |
| 10,590,257 | B2 | 3/2020 | Appel et al. |
| 10,752,840 | B2 | 8/2020 | Cha et al. |
| 10,960,249 | B2 | 3/2021 | Hulbert et al. |
| 10,960,250 | B2 | 3/2021 | Hulbert et al. |
| 10,960,251 | B1 | 3/2021 | Hulbert et al. |
| 11,041,063 | B2 | 6/2021 | Hulbert et al. |
| 11,344,760 | B2 | 5/2022 | Hulbert et al. |
| 11,395,934 | B2 | 7/2022 | Hulbert et al. |
| 11,420,084 | B2 | 8/2022 | Hulbert et al. |
| 11,534,643 | B2 | 12/2022 | Hulbert et al. |
| 11,554,279 | B2 | 1/2023 | Hubert et al. |
| 11,554,280 | B2 | 1/2023 | Hulbert et al. |
| 11,602,658 | B2 | 3/2023 | Hulbert et al. |
| 11,607,570 | B2 | 3/2023 | Hulbert et al. |
| 11,628,324 | B2 | 4/2023 | Hulbert et al. |
| 2002/0013403 | A1 | 1/2002 | Vandersall |
| 2002/0096668 | A1 | 7/2002 | Vandersall et al. |
| 2003/0010507 | A1 | 1/2003 | Greiner et al. |
| 2004/0074650 | A1 | 4/2004 | Shiga |
| 2004/0124403 | A1* | 7/2004 | Parker ............... C09K 21/02 428/920 |
| 2005/0001197 | A1 | 1/2005 | Clark |
| 2006/0113513 | A1 | 6/2006 | Nilsson |
| 2008/0196908 | A1 | 8/2008 | Schaefer |
| 2010/0063180 | A1 | 3/2010 | Kang et al. |
| 2011/0089386 | A1 | 4/2011 | Berry et al. |
| 2011/0105649 | A1 | 5/2011 | Harada et al. |
| 2011/0213065 | A1 | 9/2011 | Giesselbach et al. |
| 2012/0219947 | A1 | 8/2012 | Yurkovetsky et al. |
| 2012/0292551 | A1 | 11/2012 | Klaffmo |
| 2013/0180738 | A1 | 7/2013 | Kim et al. |
| 2013/0264509 | A1 | 10/2013 | Shalev et al. |
| 2015/0352744 | A1 | 12/2015 | Zhang et al. |
| 2015/0368560 | A1 | 12/2015 | Pascal et al. |
| 2016/0030789 | A1 | 2/2016 | Cordani |
| 2016/0264687 | A1 | 9/2016 | Tran |
| 2017/0056698 | A1 | 3/2017 | Pai et al. |
| 2018/0037998 | A1 | 2/2018 | Khosla et al. |
| 2018/0282218 | A1 | 10/2018 | Mabey |
| 2019/0153321 | A1 | 5/2019 | Simonovic |
| 2019/0322939 | A1 | 10/2019 | Kennedy et al. |
| 2020/0109253 | A1 | 4/2020 | Appel et al. |
| 2020/0254290 | A1 | 8/2020 | Robles et al. |
| 2020/0384298 | A1 | 12/2020 | Hulbert et al. |
| 2021/0309830 | A1 | 10/2021 | Hulbert et al. |
| 2022/0008773 | A1 | 1/2022 | Conboy |
| 2023/0132525 | A1 | 5/2023 | Hulbert et al. |

FOREIGN PATENT DOCUMENTS

| | | |
|---|---|---|
| CA | 2494914 C | 1/2013 |
| CN | 1225344 A | 8/1999 |
| CN | 1446993 A | 10/2003 |
| CN | 102417196 A | 4/2012 |
| CN | 104277607 A | 1/2015 |
| CN | 105586527 A | 5/2016 |
| CN | 107789783 A | 3/2018 |
| CN | 107880857 A | 4/2018 |
| CN | 110064159 A | 7/2019 |
| CN | 112391176 A | 2/2021 |
| EP | 1546286 B1 | 7/2013 |
| EP | 2617474 A1 | 7/2013 |
| FR | 2019890 A1 | 7/1970 |
| GB | 2561610 B | 8/2022 |
| KR | 20170037417 A | 4/2017 |
| KR | 20210074474 A | 6/2021 |
| RO | 101017 B1 | 3/1991 |
| WO | 2006132568 A2 | 12/2006 |
| WO | 2010059508 A1 | 5/2010 |
| WO | 2010077493 A1 | 7/2010 |
| WO | 2011088666 A1 | 7/2011 |
| WO | 2013124638 A2 | 8/2013 |
| WO | 2013141367 A1 | 9/2013 |
| WO | 2014153154 A1 | 9/2014 |
| WO | 2019163839 A1 | 8/2019 |
| WO | 2019193919 A1 | 10/2019 |
| WO | 2020254869 A1 | 12/2020 |

OTHER PUBLICATIONS

Walter et al., "Overview of flame retardants including magnesium hydroxide." Martin Marietta Magnesia Specialties (2015). 9 pages.

Water Enhancers Fact Sheet. United States Forest Service. Updated Mar. 2017. Accessed at https://www.fs.usda.gov/rm/fire/wfcs/documents/WE_FactSheet_2017-0328.pdf. 1 page.

Wu et al., "Comparative performance of three magnesium compounds on thermal degradation behavior of red gum wood." Materials 7.2 (2014): 637-652.

Wu et al., "Flame retardancy and thermal degradation behavior of red gum wood treated with hydrate magnesium chloride." Journal of Industrial and Engineering Chemistry 20.5 (2014): 3536-3542.

Zhang et al., "Flame Retardancy of High-Density Polyethylene Composites with P, N-Doped Cellulose Fibrils." Polymers 12.2 (Feb. 5, 2020): 336. 15 pages.

Agueda Costafreda, Effects of long-term forest fire retardants on fire intensity, heat of combustion of the fuel and flame emissivity. Universitat Politècnica de Catalunya, 2009. 239 pages.

Agueda et al "Different scales for studying the effectiveness of long-term forest fire retardants." Progress in Energy and Combustion Science 34.6 (2008): 782-796.

(56) References Cited

OTHER PUBLICATIONS

Batista et al. Evaluation of the efficiency of a long-term retardant, based on ammonium polyphosphate, in controlled burns under laboratory conditions Assessment of efficiency of polyphosphate ammonium fire retardant, in control burnings under laboratory conditions Scientia Forestalis, vol. 36, Issue 79, 2008, p. 223-229.

Blakely, "Laboratory method for evaluating forest fire retardant chemicals" (1970). 150 pages.

Byrd et al., "Characterizing short-wave infrared fluorescence of conventional near-infrared fluorophores." Journal of biomedical optics 24.3 (2019): 035004. 6 pages.

Cavdar et al. "Ammonium zeolite and ammonium phosphate applied as fire retardants for microcrystalline cellulose filled thermoplastic composites." Fire Safety Journal 107 (2019): 202-209.

Cellulose. Wikipedia Dec. 6, 2018. Accessed at https://en.wikipedia.org/w/index.php?title=Cellulose&oldid=872356598 on Aug. 19, 2020. 12 pages.

Di Blasi et al. "Effects of ciammonium phosphate on the yields and composition of products from wood pyrolysis." Industrial & engineering chemistry research 46.2 (2007): 430-438.

Di Blasi et al. "Thermal and catalytic decomposition of wood impregnated with sulfur-and phosphorus-containing ammonium salts." Polymer Degradation and Stability 93.2 (2008): 335-346.

Ding et al., "Recent advances in near-infrared II fluorophores for multifunctional biomedical imaging." Chemical science 9.19 (2018): 4370-4380.

Ecological Risk Assessment of Wildland Fire-Fighting Chemicals: Long-Term Fire Retardants. United States Forest Service Sep. 2017. Accessed at https://www.fs.fed.us/rm/fire/wfcs/documents/EcoRA-Retardants-ExecSummary_2017.pdf. 3 pages.

Evaluation of Wildland Fire Chemicals Standard Test Procedures STP 1.5—Fish Toxicity USFS May 7, 2007. Accessed at https://www.fs.fed.us/rm/fire/wfcs/tests/documents/stp_01_5.pdf. 2 pages.

Examination Report No. 1 in Australian Application No. 2020203746 dated May 10, 2023. 7 pages.

Extended European Search Report in European Application No. 20817923.4 dated May 16, 2023, 8 pages.

Fischel, "Evaluation of selected deicers based on a review of the literature." The SeaCrest Group, Report No. CDOT-DTD-R-2001-15 (Oct. 2001). 170 pages.

Fish Toxicity. US Forest Service Revised Sep. 6, 2017. Accessed at https://www.fs.fed.us/rm/fire/wics/performance/documents/FishTox_Foam.pdf. 2 pages.

Fiss et al., "Mechanochemical phosphorylation of polymers and synthesis of flame-retardant cellulose nanocrystals." ACS Sustainable Chemistry & Engineering 7.8 (2019): 7951-7959.

Gimenez et al. "Long-term forest fire retardants: a review of quality, effectiveness, application and environmental considerations." International Journal of Wildland Fire 13. 1 (2004): 1-15.

Grevel et al., "Experimentally determined standard thermodynamic properties of synthetic MgSO4. 4H2O (starkeyite) and MgSO4. 3H2O: A revised internally consistent thermodynamic data set for magnesium sulfate hydrates." Astrobiology 12.11 (2012): 1042-1054.

Grevel et al., "Internally consistent thermodynamic data for magnesium sulfate hydrates." Geochimica et Cosmochimica Acta 73.22 (2009): 6805-6815.

Hobbs, "Recent advances in bio-based flame retardant additives for synthetic polymeric materials." Polymers 11.2 (2019): 224. 31 pages.

Hollingbery et al., "The fire retardant behaviour of huntite and hydromagnesite—A review." Polymer degradation and stability 95.12 (2010): 2213-2225.

Huang et al., "Study on EPS thermal insulation mortar prepared by magnesium oxychloride cement." E3S Web of Conferences. vol. 198. EDP Sciences, 2020. 4 pages.

International Search Report and Written Opinion in International Patent Application No. PCT/US2020/036360 dated Nov. 30, 2020, 43 pages.

International Search Report and Written Opinion in International Patent Application No. PCT/US2020/036367 dated Sep. 9, 2020, 23 pages.

International Search Report and Written Opinion in PCT/US21/63598 dated Mar. 2, 2022 27 pages.

International Search Report in International Patent Application No. PCT/US2022/080881 dated May 8, 2023, 20 pages.

Invitation to Pay Additional Fees, and where Applicable. Protest Fee in International Patent Application No. PCT/US2020/036360 dated Aug. 24, 2020, 6 pages.

Invitation to Pay Additional Fees, and where Applicable, Protest Fee in International Patent Application No. PCT/US2021/047726 dated Nov. 9, 2021, 4 pages.

Invitation to Pay Additional Fees, and where Applicable, Protest Fee in International Patent Application No. PCT/US2022/080881 dated Mar. 3, 3023, 2 pages.

Jin et al. "Flame retardant properties of laminated bamboo lumber treated with monoammonium phosphate (MAP) and boric acid/borax (SBX) compounds." BioResources 12.3 (2017): 5071-5085.

Lamaka et al. "Comprehensive screening of Mg corrosion inhibitors." Corrosion Science 128 (2017): 224-240.

Like et al., "Handheld fire extinguisher development." Halon Options Technical Working Conference (HOTWC) 2000. 3 pages.

Liodakis et al, "Testing the retardancy effect of various inorganic chemicals on smoldering combustion of Pinus halepensis needles", Thermochimica Acta, 444.2. 2006, pp. 157-165.

Liodakis et al. "Evaluating the fire retardation efficiency of diammonium phosphate, ammonium sulphate and magnesium carbonate minerals on *Pistacia lentiscus* L." 2006 First international Symposium on Environment Identities and Mediterranean Area. IEEE, 2006, pp. 35-39.

Liodakis et al. "Evaluating the use of minerals as forest fire retardants." Fire Safety Journal 45.2 (2010): 98-105.

Liodakis et al. "The effect of (NH4) 2HPO4 and (NH4) 2SO4 on the spontaneous ignition properties of Pinus halepensis pine needles." Fire safety journal 37.5 (2002): 481-494.

Long-Term Retardants Fact Sheet. United States Forest Service Updated May 2017. Accessed at https://www.fs.usda.gov/rm/fire/wfcs/documents/Ret_FactSheet_2017-0503.pdf. 1 page.

Mostashari et al., "Thermal decomposition pathway of a cellulosic fabric impregnated by magnesium chloride hexahydrate as a flame-retardant." Journal of thermal analysis and calorimetry 93.2 (2008): 589-594.

Mostashari et al., "XRD characterization of the ashes from a burned cellulosic fabric impregnated with magnesium bromide hexahydrate as flame-retardant." Journal of thermal analysis and calorimetry 92.3 (2008): 845-849.

Non-Final Office Action in U.S. Appl. No. 16/894,231 dated Dec. 10, 2020, 10 pages.

Patent Examination Report in New Zealand Application No. 782860, dated May 10, 2023, 3 pages.

Perimeter Solutions, "Myth vs. Reality: Understanding the Chemistry of Wildfire Suppression" (Jun. 17, 2021), available at https://www.perimeter-solutions.com/wildfire-suppression-webinar/. 30 pages.

Qu et al., "The synergism of MgCO3 and 2ZnCO3 3ZnO 4H2O as flame retardants and smoke suppressants for flexible poly (vinyl chloride)(PVC)." e-Polymers 11.1 (2011). 9 pages.

Specification for Long Term Retardant, Wildland Fire, Aircraft or Ground Application. US Department of Agriculture Forest Service Specification 5100-3046. Jan. 2000. Accessed at https://www.fs.fed.us/rm/fire/documents/304_b.pdf. 24 pages.

Specification for Long Term Retardant, Wildland Firefighting. US Department of Agriculture Forest Service Specification 5100-304d. Jan. 7, 2020. Accessed at https://www.fs.fed.us/rm/fire/wfcs/documents/5100-304d_LTR_Final%20Draft_010720.pdf. 32 pages.

Specification for Long Term Retardant, Wildland Firefighting. US Department of Agriculture Forest Service Specification 5100-304c. Jun. 1, 2007. https://www.fs.fed.us/rm/fire/wfcs/documents/304c.pdf. 30 pages.

Specification for Long Term Retardant, Wildland Firefighting. US Department of Agriculture Forest Service Specification 5100-304d. Jan. 7, 2020. Amended May 6, 2021. Accessed at https://www.fs.

(56) References Cited

OTHER PUBLICATIONS usda.gov/rm/fire/wfcs/documents/5100-304d_LTR_Final_010720_with%20Amendment%201.pdf. 32 pages.
Van Der Veen et al. "Phosphorus flame retardants: properties, production, environmental occurrence, toxicity and analysis." Chemosphere 88.10 (2012): 1119-1153.

* cited by examiner

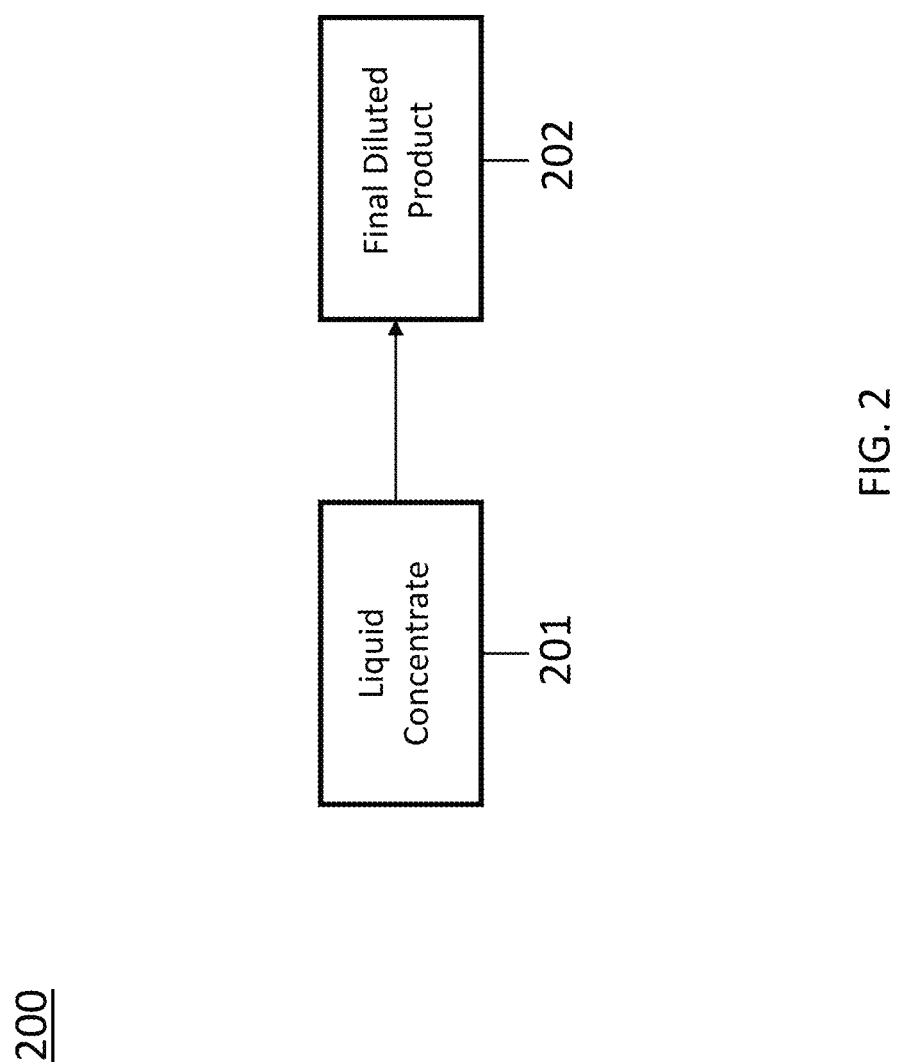

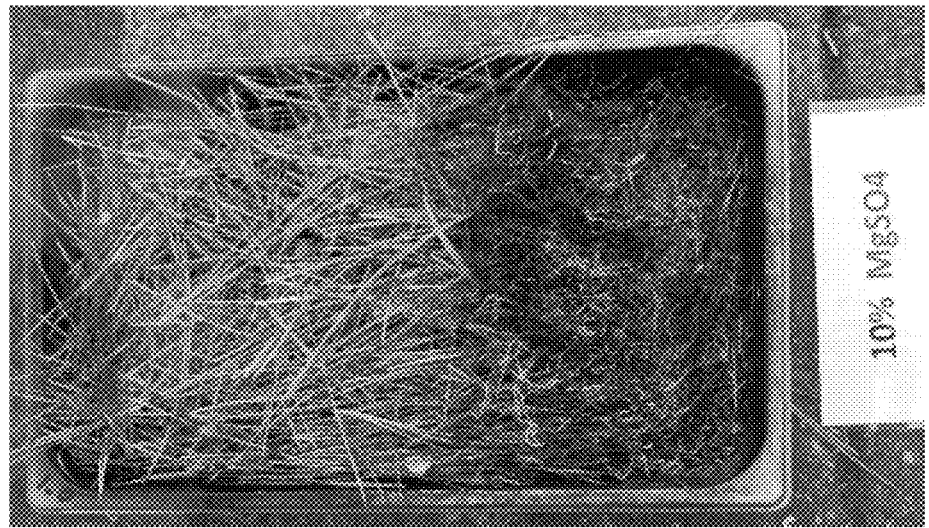
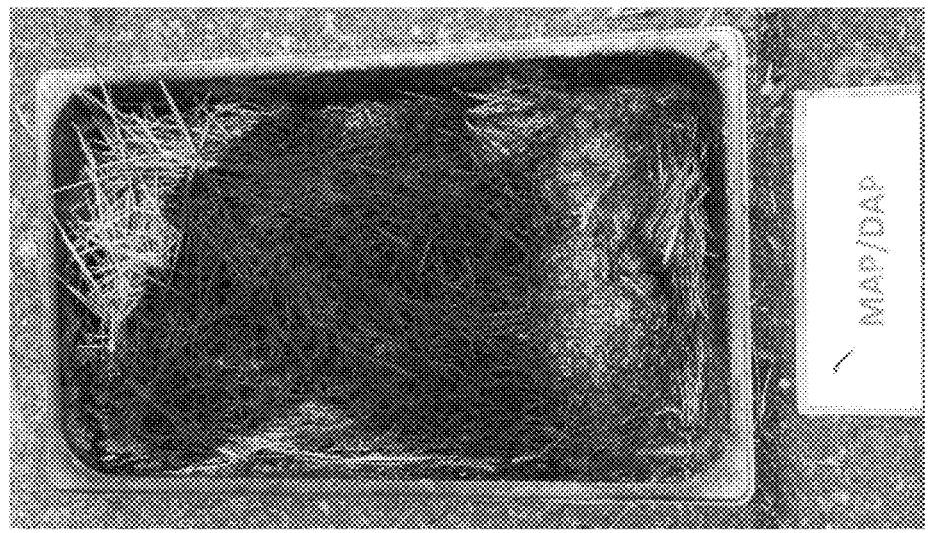
FIG. 3A

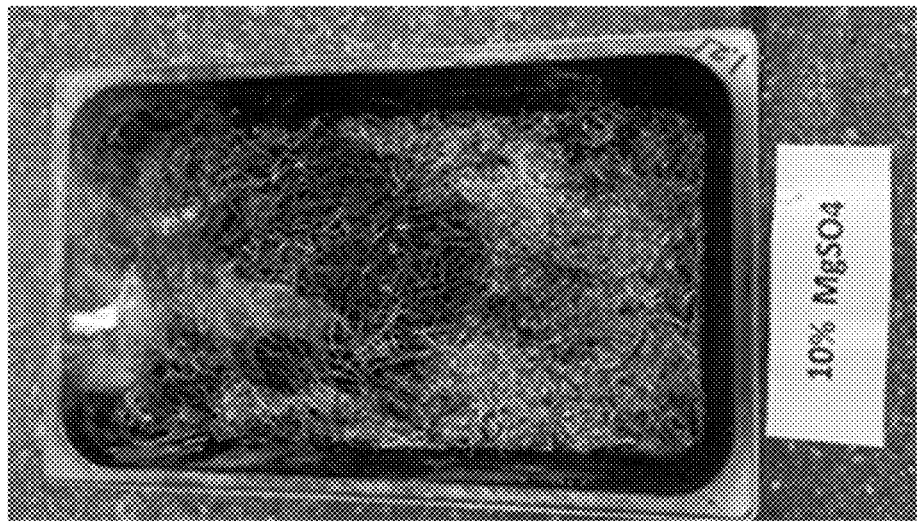
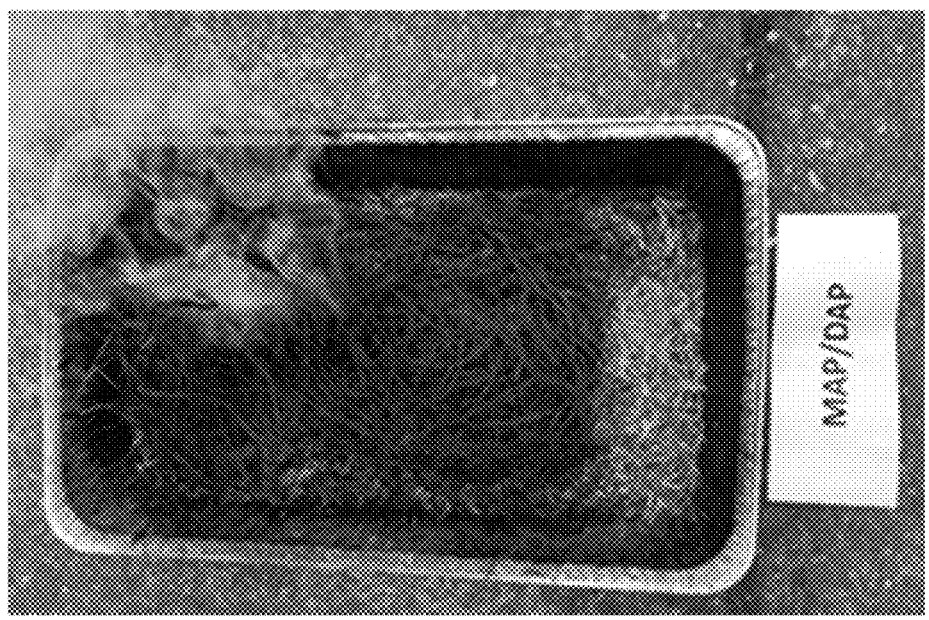
FIG. 3B

LONG-TERM FIRE RETARDANT WITH MAGNESIUM SULFATE AND CORROSION INHIBITORS AND METHODS FOR MAKING AND USING SAME

CROSS-REFERENCE TO RELATED APPLICATIONS

This application is a continuation of U.S. application Ser. No. 17/845,569 filed Jun. 21, 2022, which is a continuation of U.S. application Ser. No. 17/458,002 filed Aug. 26, 2021, which are hereby incorporated herein by reference in their entirety. U.S. application Ser. No. 17/458,002 claims a priority benefit to U.S. provisional application Ser. No. 63/125,693 filed on Dec. 15, 2020, and 63/140,657 filed on Jan. 22, 2021, which are incorporated herein by reference in their entirety.

U.S. provisional application Ser. No. 62/858,640 filed on Jun. 7, 2019, 62/989,350 filed on Mar. 13, 2020, and 63/024,040 filed on May 13, 2020, are incorporated herein by reference in their entirety.

BACKGROUND

Long-term retardants contain retardant salts that alter the way a forest fire burns, decrease the fire intensity, and slow the advance of the forest fire. Long-term retardants may be available as wet or dry concentrates that are mixed with water thereby improving water's effectiveness and ability to cling to fuels, over a long period of time. Long-term retardants may be colored with iron oxide, fugitive pigments, or remain uncolored.

In the "Ecological Risk Assessment of Wildland Fire-Fighting Chemicals: Long-Term Fire Retardants" (September 2017), hereby incorporated by reference in its entirety, the United States Forest Service ("USFS") has established a chemical toxicity risk assessment for fire-fighting chemicals currently approved for use by the USFS. The USFS uses a variety of fire-fighting chemicals to aid in the suppression of fire in wildlands. These products can be categorized as long-term retardants, foams, and water enhancers. This chemical toxicity risk assessment of the long-term retardants examines their potential impacts on terrestrial wildlife, plant, and aquatic species.

Further, in Specification 5100-304d (Jan. 7, 2020), Superseding Specification 5100-304b (July 1999), Superseding Specification 5100-00304a (February 1986), entitled "Specification for Long Term Retardant, Wildland Fire, Aircraft or Ground Application," hereby incorporated by reference in its entirety, the United States Department of Agriculture ("USDA") Forest Service has established the maximum allowable corrosion rates for 2024T3 aluminum, 4130 steel, yellow brass and Az-31-B magnesium. The corrosivity of forest fire retardants, in concentrate, to aluminum, steel, yellow brass and magnesium must not exceed 5.0 milli-inches ("mils") per year as determined by the "Uniform Corrosion" test set forth in Section 4.3.5.1 of the USDA Forest Service Specifications. The Forest Service Specifications identify the maximum amount of corrosion acceptable when both the retardant concentrate and its diluted solutions are exposed to each metal indicated above at temperatures of 70° Fahrenheit ("F") and 120° F. in both totally and partially immersed configurations. The maximum allowable corrosivity of aerially applied fire-retardant diluted solutions to aluminum is 2.0 mils per year ("mpy") and the maximum corrosivity to brass and steel is 2.0 mpy when partially immersed and 5.0 when tested in the partially immersed condition. In the partially immersed configurations, one-half of the coupon is within the solution and one-half is exposed to the vapors in the air space over the solution.

Blakely, Aylmer D., "Laboratory method for evaluating forest fire retardant chemicals" (1970), available at ScholarWorks University of Montana Graduate Student Theses, Dissertations, & Professional Papers #9184, ranked the effectiveness of chemicals for retarding combustion by measuring the rate of weight loss, the amount of radiation, and the percent residue. Diammonium phosphate (DAP), monoammonium phosphate (MAP), phosphoric acid, and potassium carbonate were identified by Blakely as the "[m]ost effective" forest fire retardants for suppressing forest fires and "rank[ed] higher than any of the other chemicals." By contrast, magnesium sulfate was identified by Blakely as one of the "[l]east effective" chemicals for suppressing forest fires and "showed little retarding effect on any parameter."

Surprisingly, in contrast to Blakely's characterization of magnesium sulfate as being the "[l]east effective" retardant, the present inventors have found that long term fire retardants including magnesium sulfate are not only comparable forest fire retardants to DAP and MAP but also exhibit superior forest fighting capabilities. Additionally, the present inventors have also found that these long term fire retardants including magnesium sulfate may also exhibit lower toxicity rates.

SUMMARY

The invention relates generally to fire retardant compositions and more particularly to long-term fire retardants suitable for use in direct or indirect attack of forest fires.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2 is a flow chart diagram showing the process of making a forest fire retardant composition from a liquid concentrate.

FIG. 3A show photographs of a burn table test with 10 wt % DAP (left) vs. 10 wt % $MgSO_4$ (right) at 60° F. and 33% humidity.

FIG. 3B show photographs of a burn table test with 10 wt % DAP (left) vs. 10 wt % $MgSO_4$ (right) at 58° F. and 36% humidity.

DETAILED DESCRIPTION

In General

Figure 1:
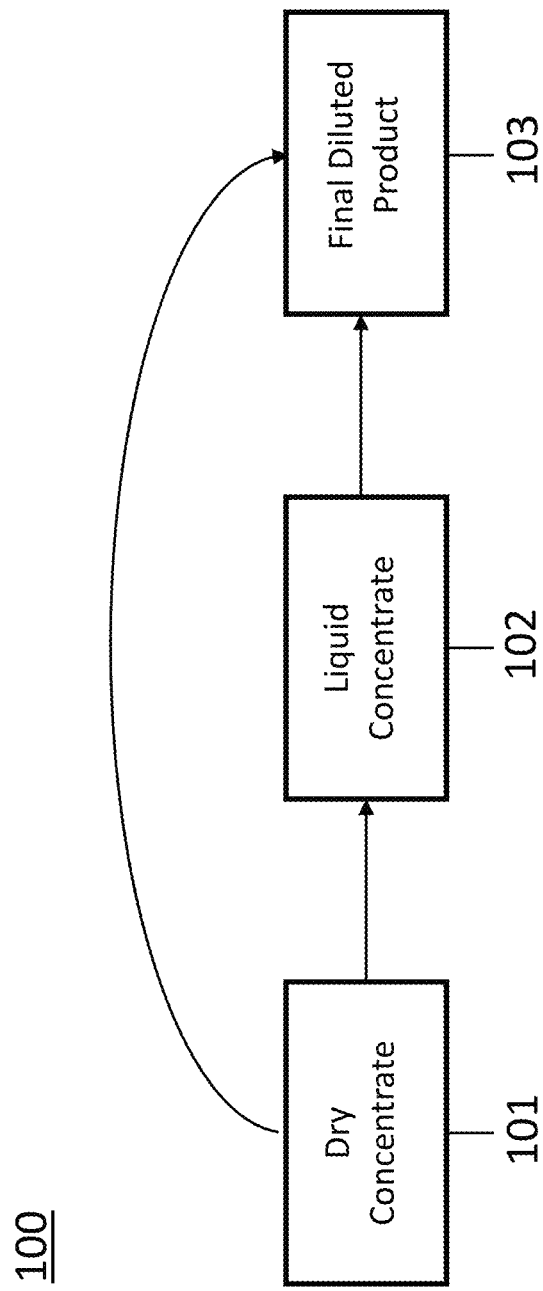
FIG. 1 is a flow chart diagram showing the process of making a forest fire retardant composition from a dry concentrate.

Referring to FIG. 1, a forest fire retardant composition 100 can be provided in various forms. The composition 100 can be provided as a dry concentrate 101 substantially free of water. Alternatively, the composition 100 can be provided as a liquid concentrate 102. The liquid concentrate 102 can be formed by adding water or other solvent(s) to the dry concentrate 101. Alternatively, liquid concentrate 102 is formed when the dry concentrate 101 is deliquescent, hygroscopic, and absorbs moisture from the air or other moisture source. The composition 100 can also be provided as a final diluted product 103 in a form suitable to fight forest fires via aerial- or ground-based application. The final diluted product 103 is formed either by diluting the dry concentrate 101 with water or by diluting the liquid concentrate 102 with water.

Referring to FIG. 2, a forest fire retardant composition 200 can be provided in various liquid forms. The composition 200 can be provided as a liquid concentrate 201. The composition 200 can also be provided as a final diluted product 202 in a form suitable to fight forest fires via aerial- or ground-based application. The final diluted product 202 is formed by diluting the liquid concentrate 201 with water in one or more diluting steps.

Components of the Concentrates 100 and 200

The forest fire retardant compositions 100 and 200 include one or more retardant compounds. The retardant compounds are preferably inorganic compounds. Table 1 below illustrates exemplary inorganic compounds, any one or more of which may be used, alone or in combination, as a retardant compound in the compositions 100 and 200.

TABLE 1

Exemplary Inorganic Retardant Compounds

| Halide Salts | Non-Halide Salts | Other inorganic retardants |
|---|---|---|
| $MgCl_2$ | $MgCO_3$ | MgO |
| $MgCl_2(H_2O)_x$ where x is 1, 2, 4, 6, 8, or 12 | $Mg_3(PO_4)_2$ | CaO |
| $CaCl_2$ | $Mg_5(CO_3)_4(OH)_2(H_2O)_4$ | $Na_2O$ |
| $CaCl_2(H_2O)_x$ where x is 1, 2, 4, or 6 | $Mg_3(PO_4)_2(H_2O)_8$ | $Li_2O$ |
| $MgBr_2$ | $CaCO_3$ | BaO |
| $CaBr_2$ | $Ca_3(PO_4)_2$ | $Mg(OH)_2$ |
| | $Mg_3Ca(CO_3)_4$ | $Ca(OH)_2$ |
| | $Ca_3(PO_4)_2(H_2O)_2$ | NaOH |
| | DAP | LiOH |

TABLE 1-continued

Exemplary Inorganic Retardant Compounds

| Halide Salts | Non-Halide Salts | Other inorganic retardants |
|---|---|---|
| | MAP | $Ba(OH)_2$ |
| | APP | KOH |
| | $K_2SO_4$ | |
| | $MgSO_4$ | |
| | $MgSO_4(H_2O)_x$ where x is 1, 2, 3, 4, 5, 6, 7, 9, 10 or 11 | |
| | $K_2Mg(SO_4)_2(H_2O)_x$ where x is 4 or 6 | |
| | $Na_2SO_4$ | |
| | $Na_2SO_4(H_2O)_x$ where x is 7 or 10 | |
| | $MgCO_3(H_2O)_x$ where x is 2, 3, or 5 | |
| | $Mg(PO_4HNH_4)_2$ | |
| | $NaPO_4HNH_4$ | |
| | $NaPO_4HNH_4(H_2O)_x$ where x = 1, 2, 3, or 4 | |

The retardant compound may be a salt. The salt may be a sulfate salt. The sulfate salt may include magnesium sulfate. The magnesium sulfate can be anhydrous, substantially free of any hydrate. Alternatively, or in combination with the anhydrous magnesium sulfate, the magnesium sulfate can be a hydrate, substantially free of any anhydrous. The hydrate may have the formula $MgSO_4(H_2O)_x$, where x is about 1 to about 11. For example, x may be equal to at least one of 1, 2, 3, 4, 5, 6, 7, 9, 10 or 11. The magnesium sulfate may contain a mixture of multiple different hydrates $MgSO_4(H_2O)_y$, such that when measured, y constitutes an average weighted number of hydrates in the mixture, and thus y is not necessarily a whole number. For example, the average weighted value of y may be about 1.0 to about 11.0, preferably about 1.5 to about 10.5, more preferably about 2.5 to about 9.5, and more preferably about 3.5 to about 8.5. The magnesium sulfate hydrate is preferably magnesium sulfate monohydrate having the formula $MgSO_4(H_2O)_1$. The magnesium sulfate may also include one or more different phases, including but not limited to, Kieserite ($MgSO_4(H_2O)_1$), Hexahydrite ($MgSO_4(H_2O)_6$), and/or Epsomite ($MgSO_4(H_2O)_7$). The sulfate salt may also include potassium sulfate ($K_2SO_4$), leonite ($K_2Mg(SO_4)_2(H_2O)_4$), or picromerite ($K_2Mg(SO_4)_2(H_2O)_6$).

Referring to FIG. 1, the composition 100 may begin as a dry concentrate 101 substantially free of water. As used herein, "substantially free of water," when referring to the dry concentrate 101, does not refer to the water of crystallization or water of hydration of the halide salt (i.e., the hydrate halide salt). Additionally, as used herein, "substantially free of water," when referring to the dry concentrate 101, does not prohibit the addition of minimal amounts of water (e.g., less than 2% weight percent relative to the amount of the retardant compound in the composition 100) to the dry concentrate 101 to assist with mixing the components. In the dry concentrate 101, the weight percent of salt is about 75% to about 96%, preferably about 80% to about 95%, more preferably about 82% to about 94%, and particularly about 85% to about 93%. For example, the weight percent of salt in the dry concentrate 101 is about 88% to about 93%, and specifically about 91%±1.0%.

Preferably, the magnesium sulfate is present in the composition 200 in an aqueous solution including magnesium sulfate and water. The water may be tap water, sea water, or water from other convenient water sources. Prior to the addition of any water used to make the magnesium sulfate solution, the magnesium sulfate may be magnesium sulfate anhydrous and/or magnesium sulfate hydrate. In the liquid concentrate 201, the magnesium sulfate solution is about 15% to about 45% $MgSO_4$ by weight, more preferably 20% to 45%, and particularly about 25% to about 35%. For example, the magnesium sulfate solution in the liquid concentrate 201 is about 28% to about 32% by weight, and specifically about 30% $MgSO_4$ by weight. The magnesium sulfate solution may be formed by the addition of water or other solvent to Epsom salt $(MgSO_4(H_2O)_7)$. Alternatively, the magnesium sulfate can be extracted from brine or sea water and may also contain small amounts of other salts and impurities. The magnesium sulfate may exist in a byproduct salt mixture with other salts that result from the extraction of magnesium chloride from brine or sea water. The salts in the byproduct salt mixture may include, but are not limited to, magnesium sulfate ($MgSO_4$), magnesium sulfate hydrate $MgSO_4(H_2O)_x$, where x is about 1 to about 11, potassium sulfate ($K_2SO_4$), leonite ($K_2Mg(SO_4)_2(H_2O)_4$), or picromerite ($K_2Mg(SO_4)_2(H_2O)_6$), magnesium chloride anhydrous ($MgCl_2$), magnesium sulfate hydrate ($MgSO_4(H_2O)_x$) where x is 1, 2, 3, 4, 5, 6, 7, 9, 10 or 11, sodium chloride (NaCl). The salts in the byproduct salt mixture may be in one or more phases, including but not limited to, kieserite ($MgSO_4(H_2O)_1$), dipotassium Sulfate (VI) ($K_2SO_4$), bischofite ($MgCl_2(H_2O)_6$), magnesium chloride anhydrous ($MgCl_2$), hexahydrite ($MgSO_4(H_2O)_6$), and/or Epsomite ($MgSO_4(H_2O)_7$).

Instead of (or in addition to) magnesium sulfate, the salt of the forest fire retardant composition 100 and/or 200 may include a non-sulfate salt. The non-sulfate salt may include a halide salt including at least one of a magnesium halide salt or a calcium halide salt. The magnesium halide salt may include magnesium chloride. The magnesium chloride can be anhydrous, substantially free of any hydrate. Alternatively, or in combination with the anhydrous magnesium chloride, the magnesium chloride can be a hydrate, substantially free of any anhydrous. The hydrate may have the formula $MgCl_2(H_2O)_x$, where x is about 1 to about 12. For example, x may be equal to at least one of 1, 2, 4, 6, 8, or 12. The magnesium chloride may contain a mixture of multiple different hydrates $MgCl_2(H_2O)_y$, such that when measured, y constitutes an average number of hydrates in the mixture, and thus y is not necessarily a whole number. For example, y may be about 1.0 to about 12.0, preferably about 1.5 to about 10.5, more preferably about 2.5 to about 9.5, and more preferably about 3.5 to about 8.5. The magnesium chloride may be present in the composition 200 in an aqueous solution including magnesium chloride and water. The water may be tap water, sea water, or water from other convenient water sources. Prior to the addition of any water used to make the magnesium chloride solution, the magnesium chloride may be magnesium chloride anhydrous and/or magnesium chloride hydrate. The magnesium chloride solution may be a corrosion inhibited magnesium chloride solution or a non-corrosion inhibited magnesium chloride solution. The magnesium chloride is a corrosion inhibited magnesium chloride solution when it includes a corrosion inhibitor in the magnesium chloride solution. The non-corrosion inhibited magnesium chloride solution does not include a corrosion inhibitor in the magnesium chloride solution. The magnesium chloride solution (corrosion inhibited or non-corrosion inhibited) may include, but is not limited to, magnesium chloride solution (CAS Number: 7786-30-3) or magnesium chloride hexahydrate (CAS Number: 7791-18-6) from Sigma Aldrich, or FreezGard Lite CI Plus, FreezGard Zero CI Plus, FreezGard Zero CI Plus LS, FreezGard CI Plus Sub Zero, FreezGard CI Plus, DustGuard, DustGard Plus, FreezGard Zero, FreezGard Lite, or MagnaPro from Compass Minerals or Hydro-Melt Green or HydroMelt Liquid Deicer from Cargill, or Iceban 200, Caliber M1000 AP, Meltdown with Shield AP, Meltdown APEX with Shield AP, FreezGard CI Plus, Ice B'Gone II HF, Ice Ban 305, FreezGard 0 CCI, Meltdown Apex, Meltdown Inhibited, ProMelt MAG 30 INH, ProMelt Ultra 1000 INH, NexGen Torch, or NexGen Liquid De-Icer. The magnesium chloride can be extracted from brine or sea water and may also contains small amounts of other salts and impurities. Alternatively, the magnesium chloride solution may be formed by the addition of water or other solvent to solid magnesium chloride anhydrous and/or magnesium chloride hydrate. The magnesium halide salt may also include one or more different phases, including but not limited to, Bischofite ($MgCl_2(H_2O)_6$) and/or magnesium chloride anhydrous ($MgCl_2$).

Instead of (or in addition to) chlorine, the magnesium halide salt may include bromine as the halogen which forms a magnesium bromide salt. The bromine may be used alone in the magnesium halide salt; alternatively, the bromine may be used in combination with chlorine, thereby forming a mixture of magnesium bromide and magnesium chloride salts. The bromine salt, when used as a bromine flame retardant, has a mechanism that is similar to chlorine and may be used as a long-term fire retardant alone or in combination with chlorine. Halogens or other compounds that liberate stable radicals in the thermal environment of the flame front also operate with a mechanism that is similar to chlorine and may be used as a long-term fire retardant.

Instead of (or in addition to) magnesium sulfate, the halide salt may be calcium chloride. The calcium chloride can be anhydrous, substantially free of any hydrate. Alternatively, or in addition to the anhydrous calcium chloride, the calcium chloride can be a hydrate, substantially free of any anhydrous. The hydrate may have the formula $CaCl_2(H_2O)_x$, where x is about 1 to about 6. For example, x may be equal to at least one of 1, 2, 4, or 6. The calcium chloride may contain a mixture of multiple different hydrates $CaCl_2(H_2O)_y$, such that when measured, y constitutes an average number of hydrates in the mixture, and thus y is not necessarily a whole number. For example, x may be about 1.0 to about 6.0, preferably about 1.5 to about 6.0, more preferably about 2.5 to about 9.5, and more preferably about 3.5 to about 8.5. Preferably, the calcium chloride is present in the composition 100 in a combination of both calcium chloride anhydrous and calcium chloride hydrate. The calcium chloride forest fire retardant composition may be used for a liquid concentrate. The calcium halide salt in the forest fire retardant composition 100 may include bromine as the halogen which forms a calcium bromide salt. The bromine may be used alone in the calcium halide salt; alternatively, the bromine may be used in combination with chlorine, thereby forming a mixture of calcium bromide and calcium chloride salts. Preferably, the calcium chloride is present in the composition 200 in an aqueous solution including calcium chloride solution and water. Prior to the addition of any water used to make the calcium chloride solution, the calcium chloride may be calcium chloride anhydrous or calcium chloride hydrate. The calcium chloride solution may be a corrosion inhibited calcium chloride solution or a non-corrosion inhibited calcium chloride solution. The calcium chloride is a corrosion inhibited calcium chloride solution when it includes a corrosion inhibitor in the calcium chloride solution. The non-corrosion inhibited calcium chloride solution does not include a corrosion inhibitor in the calcium chloride solution. The calcium chloride solution (corrosion inhibited or non-corrosion inhibited) may include, but is not limited to, calcium chloride (CAS Number: 10043-52-4) from Sigma Aldrich, Liquid Dow Armor, Winter Thaw DI, Corguard TG, Road Guard Plus, Calcium Chloride with Boost (CCB), MeltDown Apex-C, or C1000 Pro. The calcium chloride can be extracted from brine or sea water and may also contains small amounts of other salts and impurities. Alternatively, the calcium chloride solution may be formed by the addition of water or other solvent to solid calcium chloride anhydrous and/or calcium chloride hydrate. The calcium halide salt in the forest fire retardant composition 200 may include bromine as the halogen which forms a calcium bromide salt. The bromine may be used alone in the calcium salt; alternatively, the bromine may be used in combination with chlorine, thereby forming a mixture of calcium bromide and calcium chloride salts.

In the forest fire retardant composition 100 and/or 200, the weight percent of sulfate salt (including both anhydrous and hydrate): halide salt (including both anhydrous and hydrate) may be about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

Instead of (or in addition to) magnesium sulfate, the salt of the forest fire retardant composition 100 and/or 200 may include a non-sulfate salt. The non-sulfate salt may be a non-halide salt including at least one of magnesium non-halide salt, calcium non-halide salt, magnesium calcium non-halide salt, ammonium phosphate salt, or a combination thereof. The anion in the salt may include at least one of carbonate, sulfate, or phosphate. The salt may include magnesium non-halide salt, which may be anhydrous magnesium non-halide salt or magnesium non-halide salt hydrate. The magnesium non-halide salt may include at least one of magnesium carbonate ($MgCO_3$), magnesium phosphate ($Mg_3(PO_4)_2$), magnesium carbonate hydroxide hydrate ($Mg_5(CO_3)_4(OH)_2(H_2O)_4$), magnesium phosphate hydrate ($Mg_3(PO_4)_2(H_2O)_8$), or magnesium ammonium phosphate ($Mg(PO_4HNH_4)_2$). As an alternative to using a magnesium non-halide salt, or in addition to using a magnesium non-halide salt, the non-halide salt may further include calcium non-halide salt, which may be anhydrous calcium non-halide salt or calcium non-halide salt hydrate. The calcium non-halide salt may include at least one of calcium carbonate ($CaCO_3$), calcium phosphate ($Ca_3(PO_4)_2$), huntite ($Mg_3Ca(CO_3)_4$), or calcium phosphate hydrate ($Ca_3(PO_4)_2(H_2O)_2$). The magnesium halide salt may also be used in combination with the sulfate salt. For example, the sulfate salt and magnesium halide salt may include magnesium sulfate and magnesium chloride anhydrous ($MgCl_2$). A mixture of magnesium sulfate and magnesium chloride anhydrous in the forest fire retardant composition 100 and/or 200 may have a weight ratio of the total amount of salt (magnesium sulfate:magnesium chloride) from about 0%:100% to about 100%:0%, preferably about 20%:80% to about 98%:2%, more preferably about 40%:60% to about 95%:5%, for example about 60%:40% to about 90%:10%.

The sulfate salt may also be used in combination with the magnesium halide salt and/or magnesium non-halide salt. For example, the sulfate salt, magnesium non-halide salt, and magnesium halide salt may include magnesium sulfate heptahydrate ($MgSO_4(H_2O)_7$), magnesium chloride hexahydrate ($MgCl_2(H_2O)_6$), and potassium sulfate ($K_2SO_4$). A mixture of magnesium sulfate heptahydrate, magnesium chloride hexahydrate, and potassium sulfate in the forest fire retardant composition 100 and/or 200 may have a weight ratio of the total amount of salt (magnesium sulfate heptahydrate:magnesium chloride hexahydrate:potassium sulfate) from about 10%:45%:45% to about 90%:5%:5%, preferably about 20%:40%:40% to about 70%:15%:15%, for example about 40%:30%:30% to about 60%:20%:20%. The sulfate salt, magnesium non-halide salt, and magnesium halide salt may also include picromerite ($K_2Mg(SO_4)_2(H_2O)_6$) and magnesium chloride hexahydrate ($MgCl_2(H_2O)_6$). A mixture of picromerite and magnesium chloride hexahydrate in the forest fire retardant composition 100 and/or 200 may have a weight ratio of the total amount of salt (picromerite:magnesium chloride hexahydrate) from about 10%:90% to about 90%:10%, preferably about 20%:80% to about 80%:20%, for example about 55%:45% to about 70%:30%. In the final diluted product 103 or 202, the weight percent of retardant compound (e.g., sulfate salt and/or non-halide salt and/or halide salt) is about 2% to about 70%, preferably about 5% to about 40%, more preferably about 7% to about 30%. For example, the concentration of retardant compound (e.g., sulfate salt and/or halide salt) in final diluted product 103 or 202 is about 8% to about 15%, and specifically about 10%±2%.

As an alternative to using a sulfate salt, or in addition to using a sulfate salt, the salt may further include ammonium salts of ortho, pyro, tripoly, or tetrapoly phosphoric acid. The ammonium phosphates in the forest fire retardant composition 100 and/or 200 may include one or more of the following: ammonium orthophosphates, ammonium pyrophosphates, and ammonium polyphosphates having an average chain length of less than 20 phosphorus atoms. For example, the ammonium phosphate salt may include at least one of diammonium phosphate (DAP), diammonium orthophosphate (DAP), monoammonium phosphate (MAP), monoammonium orthophosphate (MAP), ammonium polyphosphate (APP), and mixtures thereof. The amount of ammonium phosphate in the concentrate 101 and/or 102 and/or 201 is from about 75% to about 97% by weight of the total concentrate. A mixture of ammonium phosphates in the forest fire retardant composition 100 and/or 200 may include MAP containing from about 10% to about 12% ammoniacal nitrogen by weight and from about 40% to about 61% phosphorus pentoxide by weight, and DAP containing from about 16% to about 21% ammoniacal nitrogen by weight and from about 40% to about 54% phosphorus pentoxide by weight. A mixture of MAP and DAP in the forest fire retardant composition 100 and/or 200 may have a weight ratio of the total ammonium phosphate (MAP:DAP) from about 5%:95% to about 60%:40%, preferably about 40%:60% to about 60%:40%, for example about 50%:50% to about 60%:40%. The sulfate salt may also be used in combination with ammonium salts of ortho, pyro, tripoly, or tetrapoly phosphoric acid. For example, the sulfate salt(s) and ammonium salt(s) of ortho, pyro, tripoly, or tetrapoly phosphoric acid may include magnesium sulfate, $MgSO_4(H_2O)_x$, where x is about 1 to about 11, Kieserite ($MgSO_4(H_2O)_1$), Hexahydrite ($MgSO_4(H_2O)_6$), Epsomite ($MgSO_4(H_2O)_7$), potassium sulfate ($K_2SO_4$), leonite ($K_2Mg(SO_4)_2(H_2O)_4$), picromerite ($K_2Mg(SO_4)_2(H_2O)_6$), diammonium phosphate (DAP), diammonium orthophosphate (DAP), monoammonium phosphate (MAP), monoammonium orthophosphate (MAP), ammonium polyphosphate (APP), and any mixtures thereof. A mixture of sulfate salt(s) and ammonium salt(s) in the fire retardant composition 100 and/or 200 may have a weight ratio of the total amount of salt (sulfate salt:ammonium salt) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios. For example, a mixture of magnesium sulfate and DAP in the forest fire retardant composition 100 and/or 200 may have a weight ratio of the total amount of salt (magnesium sulfate:DAP) from about 0%:100% to about 100%:0%, preferably about 20%:80% to about 98%:2%, more preferably about 40%:60% to about 95%:5%, for example about 60%:40% to about 90%:10%. A mixture of magnesium sulfate hydrate ($MgSO_4(H_2O)_x$, where x is about 1 to about 11) and DAP in the forest fire retardant composition 100 and/or 200 may have a weight ratio of the total amount of salt (magnesium sulfate hydrate:DAP) from about 0%:100% to about 100%:0%, preferably about 20%:80% to about 98%:2%, more preferably about 40%:60% to about 95%:5%, for example about 60%:40% to about 90%:10%. A mixture of magnesium sulfate and MAP in the forest fire retardant composition 100 and/or 200 may have a weight ratio of the total amount of salt (magnesium sulfate:MAP) from about 0%:100% to about 100%:0%, preferably about 20%:80% to about 98%:2%, more preferably about 40%:60% to about 95%:5%, for example about 60%:40% to about 90%:10%. A mixture of magnesium sulfate hydrate ($MgSO_4(H_2O)_x$, where x is about 1 to about 11) and MAP in the forest fire retardant composition 100 and/or 200 may have a weight ratio of the total amount of salt (magnesium sulfate hydrate:MAP) from about 0%:100% to about 100%:0%, preferably about 20%:80% to about 98%:2%, more preferably about 40%:60% to about 95%:5%, for example about 60%:40% to about 90%:10%. A mixture of magnesium sulfate and APP in the forest fire retardant composition 100 and/or 200 may have a weight ratio of the total amount of salt (magnesium sulfate:APP) from about 0%:100% to about 100%:0%, preferably about 20%:80% to about 98%:2%, more preferably about 40%:60% to about 95%:5%, for example about 60%:40% to about 90%:10%. A mixture of magnesium sulfate hydrate ($MgSO_4(H_2O)_x$, where x is about 1 to about 11) and APP in the forest fire retardant composition 100 and/or 200 may have a weight ratio of the total amount of salt (magnesium sulfate hydrate:APP) from about 0%:100% to about 100%:0%, preferably about 20%:80% to about 98%:2%, more preferably about 40%:60% to about 95%:5%, for example about 60%:40% to about 90%:10%. As an alternative to using a sulfate salt, or in addition to using a sulfate salt, the salt may further include more than one ammonium salts of ortho, pyro, tripoly, or tetrapoly phosphoric acid. For example, a mixture of magnesium sulfate, MAP, and DAP in the forest fire retardant composition 100 and/or 200 may have a weight ratio of the total amount of salt (magnesium sulfate:MAP:DAP) from about 0%:50%:50% to about 100%:0%:0%, preferably about 10%:45%:45% to about 90%:5%:5%, more preferably about 20%:40%:40% to about 70%:15%:15%, for example about 40%:30%:30% to about 60%:20%:20%. A mixture of magnesium sulfate, MAP, and APP in the forest fire retardant composition 100 and/or 200 may have a weight ratio of the total amount of salt (magnesium sulfate:MAP:APP) from about 0%:50%:50% to about 100%:0%:0%, preferably about 10%:45%:45% to about 90%:5%:5%, more preferably about 20%:40%:40% to about 70%:15%:15%, for example about 40%:30%:30% to about 60%:20%:20%. A mixture of magnesium sulfate, DAP, and APP in the forest fire retardant composition 100 and/or 200 may have a weight ratio of the total amount of salt (magnesium sulfate:DAP:APP) from about 0%:50%:50% to about 100%:0%:0%, preferably about 10%:45%:45% to about 90%:5%:5%, more preferably about 20%:40%:40% to about 70%:15%:15%, for example about 40%:30%:30% to about 60%:20%:20%. In the forest fire retardant composition 100 and/or 200, the weight percent of sulfate salt (including both anhydrous and hydrate): non-halide salt (including both anhydrous and hydrate) may be about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

Instead of (or in addition to) the salt, the forest fire retardant composition 100 and/or 200 may contain a retardant component that includes a metal oxide and/or metal hydroxide. It is understood that the metal oxide, in the presence of water, can undergo a reversible reaction with water to form a metal hydroxide. The metal oxide includes magnesium oxide (MgO), calcium oxide (CaO), sodium oxide ($Na_2O$), lithium oxide ($Li_2O$), and barium oxide (BaO). The metal hydroxide includes magnesium hydroxide ($Mg(OH)_2$), calcium hydroxide, ($Ca(OH)_2$), sodium hydroxide (NaOH), lithium hydroxide (LiOH), barium hydroxide ($Ba(OH)_2$), or potassium hydroxide (KOH).

The metal oxide and metal hydroxide may be present in the forest fire retardant composition 100 and/or 200 in a weight ratio (oxide:hydroxide) from about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

In the forest fire retardant composition 100 and/or 200, the weight percent of metal oxide:salt (including sulfate and non-sulfate salt) may be about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

In the forest fire retardant composition 100 and/or 200, the weight percent of metal hydroxide:salt (including sulfate and non-sulfate salt) may be about 0%:100% to about 100%:0%, including about 5%:95%, 10%:90%, 15%:85%, 20%:80%, 25%:75%, 30%:70%, 35%:65%, 40%:60%, 45%:55%, 50%:50%, 55%:45%, 60%:40%, 65%:35%, 70%:30%, 75%:25%, 80%:20%, 85%:15%, 90%:10%, 95%:5%, and any range between any two such ratios.

In the liquid concentrate 201, the salt may be hydrated. In the liquid concentrate 201, the weight percent of liquid salt solution (including any hydrate(s)) is about 75% to about 100%, preferably about 80% to about 99.5%, more preferably about 85% to about 99%, and particularly about 90% to about 98.5%. For example, the weight percent of the liquid salt solution (including both anhydrous and hydrate) in the liquid concentrate 201 is about 92% to about 98%, and specifically about 97%±1.0%. In the liquid concentrate 201, the weight percent of retardant compound is about 10% to about 50%, preferably about 15% to about 45%, more preferably about 20% to about 40%, and particularly about 25% to about 35%. For example, the weight percent of the retardant compound in the liquid concentrate 201 is about 27% to about 32%, and specifically about 29%±1.0%.

The forest fire retardant composition 200 includes water or another solvent. The water in the liquid composition 200 may be tap water or water from other convenient water sources. Preferably, the water or other solvent is present in the composition 200 in the magnesium sulfate solution.

The forest fire retardant composition 100 and/or 200 may further include a corrosion inhibitor. The corrosion inhibitor may include an inhibitor for brass, iron, aluminum, steel, copper, and/or magnesium. The corrosion inhibitor may also include an inhibitor for any of the inorganic compounds listed in Table 1. The corrosion inhibitor for magnesium may include any corrosion inhibitors disclosed in Lamaka, S. V., et al. "Comprehensive screening of Mg corrosion inhibitors." *Corrosion Science* 128 (2017), hereby incorporated by reference in its entirety. The corrosion inhibitor may include an alkyl (such as an alkyl amine) and one or more azoles. The corrosion inhibitor may include COBRATEC 928, Denatonium benzoate, benzoic acid, Diammonium phosphate, monoammonium phosphate, Wintrol SB 25Na, or a combination of the above. The corrosion inhibitor may include one or more azoles. The corrosion inhibitor may be a Wintrol® Super Azole Mix (Wintrol® SAM-H90 from Wincom, Inc). The Wintrol® SAM-H90 is designed for aqueous application. Wintrol® SAM-H90 provides corrosion resistance in highly corrosive environments caused by halogens, such chloride. Optionally, Wintrol® SAM-H38Na may be used as the corrosion inhibitor, alone or in combination with Wintrol® SAM-H90. The corrosion inhibitor may include but is not limited to, sodium selenite, sodium stearate, sodium benzoate, sodium fluoride, sodium phosphate, sodium fumarate dibasic, magnesium phosphate, benzotriazole-5-carboxcylic acid, benzotriazole, tolytriazole, 1,8-napthalaldehydic acid, octadecylphosphonic acid, sodium dodecyl sulfonate (SDBS), Wintrol® BBT-25Na, Wintrol® BBT, Wintrol® THT-T, Wintrol® THT-35PG, Wintrol® THT-50K, Wintrol® SAM-H90, Wintrol SB 25Na, Wintrol® SAM-H38Na, Wintrol® SAM-H40(OS), Wintrol® SAM-B90, berberine, pyrrolidine riccione, catechin, lysergic acid, carmine, fast green, aniline, vanillin, triethanolamine, p-chloroaniline, p-nitroaniline, p-methoxyaniline, p-methylaniline, p-cumate Na, sodium silicate, sodium molybdate, sodium molybdate dihydrate, a biopolymer (such as rhamsan gum, xanthan gum, diutan gum, or welan gum), sodium silicofluoride (SSF), and dimercaptothiadiazole (DMTD), or a combination of the above.

The weight percent of the corrosion inhibitor, relative to the amount of the retardant compound in the composition 100, is about 0.1% to about 7.0%, for example about 0.2% to about 6.0%, or about 0.3% to about 5.0%, preferably about 0.4% to about 4.0%. For example, the weight percent of the corrosion inhibitor, relative to the amount of the retardant compound in the composition 100, is about 0.5% to about 2.0%.

The weight percent of the corrosion inhibitor, relative to the amount of the retardant compound in the liquid composition 200, is about 0.1% to about 7.0%, for example about 0.2% to about 6.0%, or about 0.3% to about 5.0%, preferably about 0.4% to about 4.0%. For example, the weight percent of the corrosion inhibitor, relative to the amount of the retardant compound in the composition 200, is about 0.5% to about 2.0%.

To control the viscosity of the composition 100 and/or 200, the composition 100 and/or 200 may also include at least one thickening agent. The thickening agent may be a polyurethane, a polyvinyl alcohol, an acrylic polymer, a gum, a cellulosic, a sulfonate, a saccharide, a clay, an organosilicone, or a protein, including but not limited to latex, styrene, butadiene, polyvinyl alcohol, attapulgite, bentonite, montmorillonite, algin, collagen, casein, albumin, castor oil, cornstarch, arrowroot, yuca starch, carrageenan, pullulan, konjac, alginate, gelatin, agar, pectin, carrageenan, chitosan, xanthan gum, guar gum, rhamsan gum, diutan gum, welan gum, cellulose gum, acacia guar gum, locust bean gum, acacia gum, gum tragacanth, glucomannan polysaccharide gum, alginic acid, sodium alginate, potassium alginate, ammonium alginate, calcium alginate, carboxymethyl cellulose (CMC), methyl cellulose, hydroxyethyl cellulose (HEC), hydroxymethyl cellulose (HMC), hydroxypropyl methylcellulose (HPMC), ethylhydroxymethyl cellulose, hypromellose (INN), cetyl alcohol, cetearyl alcohol, polyethylene glycol (PEG), acrylic microgel, or acrylic amide wax. A combination of thickeners may provide a similar viscosity profile of the composition 100 and/or 200 with a varying weight percent of the thickening agent(s). For example, two or more of the above viscosity modifiers may be combined to provide a low viscosity (e.g., 150-400 cP), or a medium viscosity (e.g., 401-800 cP), or a high viscosity (e.g., 801-1500 cP).

The weight percent of the thickening agent(s), relative to the amount of the retardant compound in the composition 100, is about 0.05% to about 10.0%, preferably about 0.5% to about 7.0%, preferably about 0.75% to about 6.0%, more preferably about 1.0% to about 5.5%, and specifically about 1.5% to about 5.0%. For example, the weight percent of the thickening agent(s), relative to the amount of the retardant compound in the composition 100, is about 1.75% to about 4.5%.

The weight percent of the thickening agent(s), relative to the amount of the retardant compound in the composition 200, is about 0.05% to about 10.0%, preferably about 1.0% to about 8.0%, preferably about 1.25% to about 7.0%, more preferably about 1.5% to about 6.5%, and specifically about 1.75% to about 6.0%. For example, the weight percent of the thickening agent(s), relative to the amount of the retardant compound in the composition 200, is about 2.0% to about 5.5%.

To control the pH of the composition 100 and/or 200, the composition 100 and/or 200 may also include buffering agents such as organic amines including but not limited to triethanolamine ($C_6H_{15}NO_3$), low freeze grade triethanolamine (85% TEA and 15% water), diethanolamine, monoethanolamine, or monoethylene glycol and/or strong bases including but not limited to magnesium hydroxide ($Mg(OH)_2$), calcium hydroxide, ($Ca(OH)_2$), sodium hydroxide (NaOH), lithium hydroxide (LiOH), barium hydroxide ($Ba(OH)_2$), or potassium hydroxide (KOH).

The weight percent of the buffering agent(s), relative to the amount of the retardant compound in the composition 100, is about 0.5% to about 5.0%, preferably about 0.75% to about 4.5%, more preferably about 1.0% to about 4.0%, and specifically about 1.25% to about 3.5%. For example, the weight percent of the buffering agent(s), relative to the amount of the retardant compound in the composition 100, is about 1.5% to about 3.0%.

The weight percent of the buffering agent (s), relative to the amount of the retardant compound in the composition 200, is about 0.5% to about 5.0%, preferably about 0.75% to about 4.5%, more preferably about 1.0% to about 4.0%, and specifically about 1.25% to about 3.5%. For example, the weight percent of the buffering agent(s), relative to the amount of the retardant compound in the composition 200, is about 1.5% to about 3.0%.

The composition 100 and/or 200 may also include surfactant components including but not limited to a sodium dodecyl sulfate (SDS), sodium lauryl sulfate (SLS), sodium 4-dodecylbenzenesulfonate (SDBS), or a combination of the three to reduce surface tension and increase the spreading and wetting properties of the forest fire retardant composition 100 and/or 200.

The composition 100 and/or 200 may also include adjuvants including but not limited to triethanolamine, propylene glycol, propylene carbonate, RJ-7033, RJ-7077, Silwet HS-312, Silwet HS-604, Silwet 625, Silwet 641, Silwet PD, XFO-10S FG Silicone, XFO-30S FG, KFO 200, poloxamers (i.e. nonionic triblock copolymers composed of a central hydrophobic chain of polyoxypropylene (poly(propylene oxide)) flanked by two hydrophilic chains of polyoxyethylene (poly(ethylene oxide))), P104, PE 3100, PE6800, polyethylene glycol, or polypropylene glycol, or a combination of the above.

The composition 100 and/or 200 may also include titanium dioxide. The titanium dioxide may act as a pigment, for example, to provide a white pigment. The titanium dioxide may also act as a photo-responsive material to create opacity by scattering light or by protecting the components of the forest fire retardant composition 100 and/or 200 from UV degradation.

The weight percent of titanium dioxide, relative to the amount of the retardant compound in the composition 100, is about 0.02% to about 2.0%, preferably about 0.025% to about 1.75%, more preferably about 0.05% to about 1.5%, and more specifically about 0.1% to about 1.0%. For example, the weight percent of titanium dioxide, relative to the amount of the retardant compound in the composition 100, is about 0.125% to about 0.8%.

The composition 100 and/or 200 may also include a colorant. The colorant may be a fugitive colorant, a non-fugitive colorant, or a combination of the two. The composition 100 and/or 200 has a first hue which is a color, i.e., either colorless or a color which blends with the normal vegetation and/or ground in the drop zone. This first hue may be grey or white or a combination of the two. The colorant initially colors the composition 100 and/or 200 to a second hue which contrasts with the hue of the ground vegetation. The colorant may be a fugitive component such as a dye or a dye which is dispersed in a matrix (i.e., a pigment), which fades over time and under ambient field conditions to a colorless or less highly colored hue. Preferably the colorant is one that is compatible with magnesium sulfate. The fugitive colorant may fade over time with exposure to sunlight.

Several fugitive component dyes and pigments can be used as a colorant. For example, many water-soluble dyes fade rapidly and there are so-called fluorescent pigments (fluorescent dyes encapsulated in a resin integument or dispersed in a thermoplastic as an emulsion) which are suspended in forest fire retardant compositions and which also fade rapidly to provide a fugitive effect. Examples of fugitive dyes and pigments include, but are not limited to, C.I. Basic Red I dye, 6BL dye, Basic Violet II dye, C.I. Basic Violet 11:1 (tetrachlorozincate), C.I. Basic Red 1:1, Basic Yellow 40, acid fuchsin, basic fuchsin, new fuchsin, acid red 1, acid red 4, acid red 8, acid red 18, acid red 27, acid red 37, acid red 88, acid red 97, acid red 114, acid red 151, acid red 183, acid red 183, fast red violet 1B base, solvent red, Rhodamine B, Rhodamine 6G, Rhodamine 123, Rhodamine 110 chloride, erythrosine B, Basacryl red, Phloxine B, rose Bengal, direct red 80, direct red 80, Sudan red 7B, Congo red, neutral red, Fluorescent Red Mega 480, Fluorescent red 610, Fluorescent red 630, Fluorescent Red Mega 520, Pylaklor Red S-361, Pylaklor Scarlet LX-6364A Pylam Bright Red LX-1895 Pylam Coral LX-1801, FD&C Red #3, FD&C Red #4, FD&C Red #40, FD&C Red #4 Lake, D&C Red #33, D&C Red #33 Lake, and encapsulated-dye pigments which are available commercially, e.g., the "AX" series pigments, supplied by Day-Glo Color Corp., Cleveland, Ohio. The dye may be Liquitint 564 ($\lambda$=564 nm) or Liquitint Agro Pink 564 ($\lambda$=564 nm) from Milliken & Company (Spartanburg, SC). The colorant may also be a fluorescent pigment. The fluorescent pigment may be Day-Glo Aurora pink or another pink, red, orange, or crimson (or a combination of the four) fluorescent pigment dispersion. The fluorescent pigment may be UV sensitive and/or be substantially free of formaldehyde and/or have a Lab color spacing of "L" in a range from about 34 to about 89, "a" in a range from about 18 to about 83, and "b" in a range from about −61 to about 56, based on the International Commission of Illumination LAB color space model.

The colorant may be a colorant from Greenville Colorants (New Brunswick, NJ) or Milliken & Company (Spartanburg, SC). For example, the colorant is a colorant that is compatible for use with magnesium chloride, such as colorants used in magnesium chloride dust-control and road-stabilization formulations, or in magnesium chloride de-icing formulations. The colorant may be Elcomine Scarlet NAS, Elcomine Scarlaet NAS EX, or Iron Oxide GC-110P from Greenville Colorants. The colorant may be a combination of Liquitint 564 and Iron Oxide GC-110P.

The colorant of the composition 100 and/or 200 may be a dye or include encapsulated-dye fugitive pigments without ultraviolet absorbers. Compared to water soluble dyes, encapsulated-dye pigments are less likely to permanently stain the normal vegetation and/or ground in the drop zone. The fugitive component is present in an amount which provides a color (second hues) to the forest fire retardant composition 100 and/or 200 which is contrasts with the color of the vegetation and/or ground in the drop zone (normally green, blue-green and/or brown). Advantageously, the second hue is red, orange or pink. The color of the dye may be red, orange, purple, or pink or any combination of the four. Preferably, the dye is one that is compatible with magnesium sulfate. Alternatively, the composition 100 and/or 200 may be colorless if no colorant is added.

The colorant may also include a non-fugitive component, i.e., a component which is insoluble in the carrier liquid and which, if colored, does not necessarily fade after aerial application of the forest fire retardant composition 100 and/or 200. The non-fugitive component of the colorant is present in an amount sufficient to improve the aerial visibility of the composition when it is first applied to the vegetation. However, the non-fugitive component is present in less than an amount which prevents the composition from thereafter fading a neutral color. The colorant may be a combination of the fugitive and non-fugitive components. The non-fugitive component in the forest fire retardant composition 100 and/or 200 may be iron oxide ($Fe_2O_3$ and/or $Fe_3O_4$). The iron oxide may be present in combination with the fugitive colorant described above and titanium dioxide or it may be present alone. The weight of the non-fugitive colorant may contain a minimum of at least 12 grams of the non-fugitive colorant in accordance with Specification 5100-304d (Jan. 7, 2020), which is hereby incorporated by reference in its entirety.

The weight percent of colorant (e.g., fluorescent pigment), relative to the amount of the retardant compound in the dry concentrate 100, is about 0.1% to about 5.0%, preferably about 0.2% to about 4.5%, more preferably about 0.3% to about 4.0%, and more specifically about 0.4% to about 3.5%. For example, the weight percent of colorant, relative to the amount of the retardant compound in the dry concentrate 100, is about 0.5% to about 3.0%.

The weight percent of dye, relative to the amount of the retardant compound in the composition 100, is about 0.02% to about 3.0%, preferably about 0.025% to about 2.0%, more preferably about 0.05% to about 1.5%, and more specifically about 0.075% to about 1.2%. For example, the weight percent of dye, relative to the amount of the retardant compound in the composition 100, is about 0.1% to about 1.0%, and specifically about 0.6%±0.3%.

The weight percent of colorant (e.g., fluorescent pigment), relative to the amount of the retardant compound in the liquid concentrate 200, is about 0.1% to about 5.0%, preferably about 0.2% to about 4.5%, more preferably about 0.3% to about 4.0%, and more specifically about 0.4% to about 3.5%. For example, the weight percent of colorant, relative to the amount of the retardant compound in the liquid concentrate 100, is about 0.5% to about 3.0%.

The weight percent of dye, relative to the amount of the retardant compound in the composition 200, is about 0.02% to about 3.0%, preferably about 0.025% to about 2.0%, more preferably about 0.05% to about 1.5%, and more specifically about 0.075% to about 1.2%. For example, the weight percent of dye, relative to the amount of the retardant compound in the composition 200, is about 0.1% to about 1.0%, and specifically about 0.7%±0.4%.

The composition 100 and/or 200 may also include Iron Oxide. The Iron Oxide may act as an opacifier. The weight percent of the Iron Oxide, relative to the amount of the retardant compound in the composition 100, is about 0.02% to about 4.0%, preferably about 0.025% to about 2.0%, more preferably about 0.05% to about 1.5%, and more specifically about 0.075% to about 1.2%. For example, the weight percent of the Iron Oxide, relative to the amount of the retardant compound in the composition 100, is about 0.1% to about 1.0%, and specifically about 0.6%±0.3%. In one embodiment, no Iron Oxide is used in the composition 100.

The composition 100 and/or 200 may also include Iron Oxide Black. The Iron Oxide Black may act as an opacifier. The weight percent of the Iron Oxide Black, relative to the amount of the retardant compound in the composition 200, is about 0.25% to about 6.0%, preferably about 0.5% to about 5.75%, more preferably about 0.75% to about 5.5%, and more specifically about 1.0% to about 5%. For example, the weight percent of the Iron Oxide Black, relative to the amount of the retardant compound in the composition 200, is about 1.25% to about 4.5%, and specifically about 2.9%±1%. In one embodiment, no Iron Oxide Black is used in the composition 200.

The composition 100 and/or 200 may also include a glow-in-the-dark additive. The glow-in-the-dark additive improves the visibility of the fire retardant composition during periods of darkness. Nighttime visibility of the composition is improved, for example, to the naked human eye and/or using imaging equipment such as goggles. The glow-in-the-dark additive can include one or more phosphorescent additives that imparts photoluminescence properties to the forest fire retardant composition 100 and/or 200. The phosphorescent additive may exhibit fluorescence and/or phosphorescence. The phosphorescent additive may be charged with sunlight or artificial lighting, such as UV radiation or Fluorescent lighting. The phosphorescent additive may emit light in the visible light region or in the ultraviolet region. Alternatively, the phosphorescent additive may emit light in the near infrared region and be visualized using infrared goggles. Examples of the phosphorescent additive include LumiNova, LumiNova Green (G), LumiNova G PS-2, LumiNova Blue Green (BG), a zinc sulfide pigment, or mixtures thereof. The amount of the glow-in-the-dark additive, relative to the amount of composition 100 and/or 200 is about 100 g/1000 L to about 1000 g/1000 L, preferably about 200 g/1000 L to about 800 g/1000 L, and more preferably about 300 g/1000 L to about 700 g/1000 L. For example, the amount of the glow-in-the-dark additive, relative to the amount of composition 100 and/or 200 is about 350 g/1000 L to about 550 g/1000 L.

The glow-in the-dark additive may also include one or more fluorophores. The fluorophore(s) may exhibit fluorescence and/or phosphorescence. The fluorophore(s) may be visible in the near infrared region (i.e., 700 nm-1700 nm wavelength of light). Visualization can be achieved using near infrared goggles. Examples of fluorophores include CH1055 (4.8-Bis(2-(4-(bis(4-(2-carboxyethyl)phenyl)amino)phenyl)-5H-[1,2,5]thiadiazolo[3,4-f]benzo[c][1,2,5]thiadiazole), as well as Cy7 or Cy7.5, or mixtures thereof. Glow-in-the-dark additives that exhibit fluorescence include fluorescent pigments described above.

The composition 100 and/or 200 may optionally include other ingredients, such as spoilage inhibitors, flow conditioners, anti-foaming agents, foaming agents, stability additives, biocide, thickening agents, surfactants, adjuvants, corrosion inhibitors other than those of the corrosion inhibiting system, opacifiers, additional coloring agents, liquid carrier, dedusters, and water. The deduster may include mineral oil. The weight percent of mineral oil, relative to the amount of the retardant compound in the composition 100 and/or 200, is about 0.1% to about 2.5%, preferably about 0.2% to about 2.25%, more preferably about 0.3% to about 2.0%, and more specifically about 0.4% to about 1.75%. For example, the weight percent of mineral oil, relative to the amount of the retardant compound in the composition 100 and/or 200, is about 0.5% to about 1.5%.

Formation of the Dry Concentrate 101

The dry components of the forest fire retardant composition 100 are batch mixed in a tumbler to form a dry concentrate 101. Alternatively, the dry components may be continuously mixed. In one embodiment the organic amine (e.g., triethanolamine), corrosion inhibitor, and water may be added as a pack to the dry concentrate 101. In another embodiment the pack may also include the colorant. The pack may include water to assist with mixing the components of the dry concentrate. The dry concentrate 101 is then stored, substantially in the absence of air and/or external moisture, in a sealed bag having a plastic liner and/or moisture barrier. For example, each sealed bag can contain about 2,000 pounds of the dry concentrate 101 during storage and shipment to the point of use (e.g., airfield). Alternatively, the dry concentrate 101 may be stored in lined one-ton tote sacks or super sacks. Air-sealed bags with a plastic liner supplied by Semi-Bulk Systems Inc. (St. Louis, MO) can be used. Alternatively, an air-permeable moisture barrier can be used, such as a barrier made of a silicone material. The dry concentrate 101 is substantially free of water. The dry composition 101 is chemically stable under normal temperatures and pressures. The dry concentrate 101 should be protected from exposure to humidity and moisture on moisture-proof air pallets or under a water-resistant tarp during storage. The dry concentrate 101 may be supplied as part of a kit that includes a sealed container substantially in the absence of air and/or external moisture (e.g., air-sealed bag, air-permeable moisture sealed bag, tote sack, super sack) and instructions for using the dry concentrate 101 to form the final diluted product 103 (described below). In the case where the final diluted product 103 is to be applied on a localized scale by homeowners or local officials, for example, the kit may contain a tank for mixing and applying the final diluted product 103 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the dry concentrate 101 to form and apply the final diluted product 103.

Forming the Intermediate Liquid Concentrate 102

The liquid concentrate 102 may be formed by the addition of water or other solvent to the dry concentrate 101. The water may be tap water or water from other convenient water sources. Alternatively, the liquid concentrate 102 may be formed upon absorption of moisture by the dry concentrate 101 if the dry concentrate 101 is deliquescent.

The dry concentrate 101 is first mixed to disperse the thickening agent(s) in the dry blend before any liquid additions. The dry concentrate 101 is agitated to prevent clumping of the dry components when batch mixed with water or other solvent to form the liquid concentrate 102. Alternatively, the liquid concentrate 102 may be prepared using continuous mixing equipment. Alternatively, the water or other solvent may be added by spraying onto a ribbon of well-mixed dry ingredients. For example, the water or other solvent could be sprayed onto the dry components while traveling across a conveyor belt. Once mixed, the liquid concentrate 102 is then stored, substantially in the absence of air, in a sealed container. For example, the sealed container for storage and shipment to the point of use (e.g., airfield) may be a 1,000 L tote, a 5-gallon pail or a 55-gallon drum. The liquid concentrate 102 is chemically stable under normal temperatures and pressures.

Instead of (or in addition to) the salt, the liquid concentrate 102 may include a metal oxide and/or a metal hydroxide. It is understood that the metal oxide, in the presence of water, can undergo a reversible reaction with water to form a metal hydroxide. The weight percent of metal hydroxide may be about 2% to about 60%, preferably about 5% to about 50%, more preferably about 7% to about 45%. For example, the concentration of metal hydroxide in the liquid concentrate 102 may be about 8% to about 40%, and specifically about 32%±3%.

The liquid concentrate 102 may be supplied as part of a kit that includes a sealed container for storage and shipment substantially in the absence of air and/or external moisture (e.g., 1,000 L tote, a 5-gallon pail or a 55-gallon drum) and instructions for using the liquid concentrate 102 to form the final diluted product 103 (described below). In the case where the final diluted product 103 is to be applied on a localized scale by homeowners or local officials, for example, the kit may contain a tank for mixing and applying the final diluted product 103 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the liquid concentrate 102 to form and apply the final diluted product 103.

Forming the Final Diluted Product 103

The final diluted product 103 is formed either directly from the dry concentrate 101 by mixing the dry concentrate 101 with water or by mixing the liquid concentrate 102 with water. The dry concentrate 101 or the liquid concentrate 102 is shipped to the point of use (e.g., airfield), where it is diluted with water or other solvent to form the final diluted product 103. The dry concentrate 101 is added slowly into room temperature (or cooler) water with stirring. The water may be tap water or water from other convenient water sources. The product is mixed using the current mixing equipment available to the USFS.

The reaction exhibits a low exotherm and a good mix ratio. The product is stirred for about 2-30 minutes depending on the mixing technology and the scale. The final diluted product 103 can also be prepared on a commercial batch scale by combining the dry concentrate 101 with a measured amount of water in an appropriate mix vessel such as an agitated mix tank. Alternatively, the final diluted product 103 may be prepared on a commercial batch scale using continuous mixing equipment. The rate of addition of solid concentrate to water should be controlled to assure efficient mixing of the concentrate and the water. Alternately, a continuous process may be conducted by introducing the dry concentrate 101 into a water stream via a vacuum eductor system. Downstream mixing should be accomplished to avoid product settling in the receiving tank, or the receiving tank itself should be vigorously circulated to facilitate solution and adequate hydration of the dry concentrate 101.

The final diluted composition 103 can also be batch mixed by feeding the dry concentrate 101 into a well-circulated mix-batch tank. Alternatively, the final diluted composition 103 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. For batch mixing, the mix water is agitated or circulated to provide efficient mixing, then a one-ton sack of dry concentrate 101 is added slowly, typically by suspending the sack over the mix tank (via a fork lift or by other manner), and opening the discharge spout on the sack to allow product to flow out of the sack into the mix solution. The addition rate should be controlled to avoid settling of the solid concentrate in the mix tank. The final diluted product 103 is in a form suitable to fight forest fires via aerial- or ground-based application.

The dry concentrate 101 may be diluted with water so that the final diluted product 103 has a retardant compound (e.g. salt) weight percent of about 2% to about 70%, preferably about 5% to about 40%, more preferably about 7% to about 30%. For example, the concentration of retardant compound (e.g., salt) in final diluted product 103 is about 8% to about 25%.

The liquid concentrate 102 may be diluted with water so that the final diluted product 103 has a retardant compound (e.g. salt) weight percent of about 2% to about 70%, preferably about 5% to about 40%, more preferably about 7% to about 30%. For example, the concentration of retardant compound (e.g., salt) in final diluted product 103 is about 8% to about 25%.

The final diluted product 103 is a long-term forest fire retardant with improved aerial visibility for either a direct or indirect attack. The resulting final diluted product 103 is an opaque reddish and/or pinkish and/or orangish suspension that resists settling. The final diluted product 103 should be mixed approximately every 7-10 days to ensure uniform density. The viscosity of the final diluted product 103 can be adjusted to accommodate a variety of aircrafts by adjusting the amounts of thickening agent(s) added to the mixture. The final diluted product 103 may be a medium viscosity long term retardant. The viscosity may be in the range of 400 cP to 800 cP. The final diluted product 103 may alternatively be a high viscosity long term retardant through the addition of more thickening agent. Alternatively, the final diluted product 103 may be a low viscosity long term retardant through the use of less thickening agent. Once blended with water, the final diluted product 103 is a homogeneous, stable fluid that requires only infrequent stirring. The final diluted product 103 is hydrated into a stable mixture in 20 minutes, without the use of special equipment.

Forming the Liquid Concentrate 201

The components of the forest fire retardant composition 200 are batch mixed to form a liquid concentrate 201. Alternatively, the forest fire retardant composition 200 may be mixed using continuous mixing equipment. The mixing should be controlled to ensure that all of the dry components are adequately dispersed and hydrated to ensure that the formulation is maintained. The water in the liquid composition 201 may be tap water or water from other convenient water sources. The liquid composition 201 is chemically stable under normal temperatures and pressures. Once mixed, the liquid concentrate 201 is then stored, substantially in the absence of air and/or external moisture, in a sealed container. The liquid concentrate 201 should be protected from exposure to humidity and moisture. For example, the sealed container for storage and shipment to the point of use (e.g., airfield) may be a 1,000 L tote, a 5-gallon pail or a 55-gallon drum. The liquid concentrate 201 is chemically stable under normal temperatures and pressures.

The liquid concentrate 201 may be a medium viscosity liquid concentrate. The viscosity may be in the range of 400 cP to 800 cP, and more preferably the viscosity may be about 450 cP to 700 cP at 70° F. The liquid concentrate 201 may alternatively be a high viscosity liquid concentrate through the addition of more thickening agent. Alternatively, the liquid concentrate 201 may be a low viscosity long term retardant through the use of less thickening agent.

The liquid concentrate 201 composition may include up to 100% hydrated salt. The hydrated salt may be at least one of magnesium sulfate. The weight percent of salt in the liquid concentrate 201 is about 5% to about 40%.

The liquid concentrate 201 may be supplied as part of a kit that includes a sealed container for storage and shipment, substantially in the absence of air and/or external moisture, (e.g., 1,000 L tote, a 5-gallon pail or a 55-gallon drum) and instructions for using the liquid concentrate 201 to form the final diluted product 202 (described below). Air-sealed bags with a plastic liner supplied by Semi-Bulk Systems Inc. (St. Louis, MO) can be used. Alternatively, an air-permeable moisture barrier can be used, such as a barrier made of a silicone material. In the case where the final diluted product 202 is to be applied on a localized scale by homeowners or local officials, for example, the kit may contain a tank for mixing and applying the final diluted product 202 (e.g., a 1-2 gallon hand-held or 4 gallon backpack or 5 gallon cart-style container with an applicator wand and/or hose, or a 15-25 gallon tank capable of being mounted on or pulled behind an all-terrain vehicle or truck), and instructions for using the liquid concentrate 201 to form and apply the final diluted product 202.

Forming the Final Diluted Product 202

The final diluted product 202 is formed by mixing the liquid concentrate 201 with water. The liquid concentrate 201 is shipped to the point of use (e.g., airfield), where it is diluted with water or other solvent to form the final diluted product 202. The water may be tap water or water from other convenient water sources. The product is mixed using the current mixing equipment available to the USFS. The liquid concentrate 201 is very miscible in water and special mixing precautions are not necessary other than to limit splash escaping the mixing vessel. The tank contents should be circulated via a centrifugal pump or another stirring means to ensure uniform mixing.

The reaction has a low exotherm and a good mix ratio. The product is stirred for about 20-30 minutes before being allowed to stand to develop a stable viscosity and ensure a uniform mixture. The final diluted product 202 can also be prepared on a commercial batch scale by combining the liquid concentrate 201 with a measured amount of water in an appropriate mix vessel such as an agitated mix tank. Alternatively, the final diluted composition 202 may be prepared on a commercial batch scale using continuous mixing equipment. The rate of addition of liquid concentrate to water should be controlled to assure efficient mixing of the concentrate and the water. The final diluted product 202 forms a stable suspension and should be stirred after standing to eliminate any settling of the components.

The final diluted composition 202 can also be batch mixed by feeding the liquid concentrate 201 into a well-circulated mix-batch tank. Alternatively, the final diluted composition 202 may be mixed using continuous mixing equipment. Mix tank agitation may be provided via an overhead mechanical stirring apparatus or alternatively by a circulation pump sized to provide turbulent mixing. Alternatively, a venturi-type vacuum eductor mixer or an in-line high-shear mixer can be used. The final diluted product 202 is in a form suitable to fight forest fires via aerial- or ground-based application.

In the final diluted product 202, the weight percent of retardant compound (e.g., salt) is about 2% to about 70%, preferably about 5% to about 40%, more preferably about 7% to about 30%. For example, the concentration of retardant compound (e.g., salt) in final diluted product 202 is about 8% to about 15%, and specifically about 10%±2%.

The final diluted product 202 is a long-term forest fire retardant with improved aerial visibility for either a direct or indirect attack. The resulting final diluted product 202 is an opaque pink or red-purple suspension that resists settling. The final diluted product 202 should be mixed approximately every 7-10 days to ensure uniform density. The viscosity of the final diluted product 202 can be adjusted to accommodate a variety of aircrafts by adjusting the amounts of thickening agent(s) added to the mixture. The final diluted product 202 may be a medium viscosity long term retardant. The viscosity may be in the range of 400 cP to 800 cP and more preferably in the range of 420 cP to 600 cP. The final diluted product 202 may alternatively be a high viscosity long term retardant through the addition of more thickening agent. Alternatively, the final diluted product 202 may be a low viscosity long term retardant through the use of less thickening agent. Once blended with water, the final diluted product 202 is a homogeneous, stable fluid that requires only infrequent stirring. The final diluted product 202 is hydrated into a stable mixture in 20 minutes, without the use of special equipment.

EXAMPLES

Example 1

In Example 1, a dry concentrate is prepared containing the amounts of ingredients listed in Table 2 below. The values in Table 2 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 2

Dry Concentrate according to Example 1

| Ingredient | Weight Percent of Each Ingredient in Dry Concentrate |
|---|---|
| $MgSO_4(H_2O)$ | 91.00% |
| Mineral Oil | 0.80% |
| Triethanolamine ($C_6H_{15}NO_3$) | 1.57% |
| Corrosion inhibitor | 0.80% |
| Thickening agent 1 - Polysaccharide gum | 3.23% |
| $TiO_2$ | 0.21% |
| Fluorescent Pigment | 1.57% |
| Water | 0.80% |
| Total Weight of Dry Concentrate | 100% |

In Example 1, the final diluted product 103 is prepared by mixing approximately 1.21 pounds of the dry concentrate in 1 gallon of water. The amounts of the ingredients in the Example 1 final diluted product 103 are listed in Table 3 below. The values in Table 3 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 1 final diluted product 103 is about 5% to 20% by weight in water, preferably about 6% to 18%, more preferably about 7% to 16%. For example, the weight percent of salt in the Example 1 final diluted product 103 is about 11.5%±1.0%.

TABLE 3

Final Diluted Product according to Example 1

| Ingredient | Weight Percent of Each Ingredient in Final Diluted Product |
|---|---|
| $MgSO_4(H_2O)$ | 11.50% |
| Mineral Oil | 0.10% |
| Triethanolamine ($C_6H_{15}NO_3$) | 0.20% |
| Corrosion inhibitor | 0.10% |
| Thickening agent 1 - Polysaccharide gum | 0.41% |
| $TiO_2$ | 0.03% |
| Fluorescent Pigment | 0.20% |
| Water | 87.47% |
| Total Weight of Final Diluted Product | 100% |

In Example 1, the final diluted product 103 is a medium viscosity long term fire retardant. The viscosity of the final diluted product 103 of Example 1 may be in the range of 400-550 cPs, for example 450-500 cPs. The viscosity was measured after mixing for 4 minutes at 10,000 rpm and using a rotational viscometer at 60 rpm. The specific gravity of the final diluted product 103 of Example 1 may be in the range of about 0.8 g/mL to about 1.2 g/mL, for example about 1.0 g/mL to about 1.1 g/mL. The pH of the final diluted product 103 of Example 1 may be in the range of about 7.0 to about 8.0, for example about 7.5.

Example 2

In Example 2, a dry concentrate is prepared containing the amounts of ingredients listed in Table 4 below. The values in Table 4 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 4

Dry Concentrate according to Example 2

| Ingredient | Weight Percent of Each Ingredient in Dry Concentrate |
|---|---|
| $MgSO_4(H_2O)$ | 87.06% |
| Mineral Oil | 0.77% |
| Triethanolamine ($C_6H_{15}NO_3$) | 1.50% |
| Corrosion inhibitor | 5.30% |
| Thickening agent 1 - Polysaccharide gum | 3.09% |
| Fluorescent Pigment | 1.50% |
| Water | 0.77% |
| Total Weight of Dry Concentrate | 100% |

In Example 2, the final diluted product 103 is prepared by mixing approximately 1.10 pounds of the dry concentrate in 1 gallon of water. The amounts of the ingredients in the Example 2 final diluted product 103 are listed in Table 5 below. The values in Table 5 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 2 final diluted product 103 is about 5% to 20% by weight in water, preferably about 6% to 18%, more preferably about 7% to 16%. For example, the weight percent of salt in the Example 2 final diluted product 103 is about 11.5%±1.0%.

TABLE 5

Final Diluted Product according to Example 2

| Ingredient | Weight Percent of Each Ingredient in Final Diluted Product |
|---|---|
| $MgSO_4(H_2O)$ | 11.50% |
| Mineral Oil | 0.10% |
| Triethanolamine ($C_6H_{15}NO_3$) | 0.20% |
| Corrosion inhibitor | 0.70% |
| Thickening agent 1 - Polysaccharide gum | 0.41% |
| Fluorescent Pigment | 0.20% |
| Water | 86.89% |
| Total Weight of Final Diluted Product | 100% |

Example 3

In Example 3, a dry concentrate is prepared containing the amounts of ingredients listed in Table 6 below. The values in Table 6 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The Example 3 dry concentrate 102 may also include approximately 0.05 to 0.4 grams of sodium hydroxide, and particularly about 0.25 to 0.3 grams.

TABLE 6

Dry Concentrate according to Example 3

| Ingredient | Weight Percent of Each Ingredient in Dry Concentrate |
|---|---|
| $MgSO_4(H_2O)$ | 89.08% |
| Mineral Oil | 0.79% |

TABLE 6-continued

Dry Concentrate according to Example 3

| Ingredient | Weight Percent of Each Ingredient in Dry Concentrate |
|---|---|
| Triethanolamine ($C_6H_{15}NO_3$) | 1.54% |
| Corrosion inhibitor | 3.10% |
| Thickening agent 1 - Polysaccharide gum | 3.16% |
| Fluorescent Pigment | 1.54% |
| Water | 0.79% |
| Total Weight of Dry Concentrate | 100% |

In Example 3, the final diluted product 103 is prepared by mixing approximately 1.08 pounds of the dry concentrate in 1 gallon of water. The amounts of the ingredients in the Example 3 final diluted product 103 are listed in Table 7 below. The values in Table 7 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 3 final diluted product 103 is about 5% to 20% by weight in water, preferably about 6% to 18%, more preferably about 7% to 16%. For example, the weight percent of salt in the Example 3 final diluted product 103 is about 11.5%±1.0%.

TABLE 7

Final Diluted Product according to Example 3

| Ingredient | Weight Percent of Each Ingredient in Final Diluted Product |
|---|---|
| $MgSO_4(H_2O)$ | 11.50% |
| Mineral Oil | 0.10% |
| Triethanolamine ($C_6H_{15}NO_3$) | 0.20% |
| Corrosion inhibitor | 0.40% |
| Thickening agent 1 - Polysaccharide gum | 0.41% |
| Fluorescent Pigment | 0.20% |
| Water | 87.19% |
| Total Weight of Final Diluted Product | 100% |

Example 4

In Example 4, a liquid concentrate is prepared containing the amounts of ingredients listed in Table 8 below. The values in Table 8 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 8

Liquid Concentrate according to Example 4

| Ingredient | Weight Percent of Each Ingredient in Liquid Concentrate |
|---|---|
| 30% $MgSO_4$ Brine | 97.06% |
| Mineral Oil | 0.30% |
| Triethanolamine ($C_6H_{15}NO_3$) | 0.58% |
| Corrosion inhibitor | 0.30% |
| Thickening agent 1 - Polysaccharide gum | 1.19% |
| Fluorescent Pigment | 0.58% |
| Total Weight of Liquid Concentrate | 100% |

In Example 4, the liquid concentrate 201 is a medium viscosity long term fire retardant. The viscosity of the liquid concentrate 201 of Example 4 may be in the range of 400-700 cPs, for example 500-600 cPs. The viscosity was measured after mixing for 4 minutes at 10,000 rpm and using a rotational viscometer at 60 rpm. Alternatively, in Example 4, the liquid concentrate 201 may be a low viscosity long term fire retardant in the range of 150-400 cP by adjusting the amount of thickening agent 1 in the Example 4 composition 200. For example, the weight percent of the thickening agent 1 in the Example 4 liquid concentrate 201 may be about 0.5 to about 0.8 for a low viscosity long term fire retardant.

In Example 4, the final diluted product 202 is prepared by mixing the liquid concentrate 201 with water in a weight ratio concentrate:water of about 0.5:2.5 to about 1.5:3.5 and preferably about 1:2.9. The amounts of the ingredients in the Example 4 final diluted product 202 are listed in Table 9 below. The values in Table 9 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 4 final diluted product 202 is about 5% to 20% by weight in water, preferably about 6% to 18%, more preferably about 7% to 16%. For example, the weight percent of salt in the Example 4 final diluted product 202 is about 10%±1.0%.

TABLE 9

Final Diluted Product according to Example 4

| Ingredient | Weight Percent of Each Ingredient in Final Diluted Product |
|---|---|
| 30% $MgSO_4$ Brine | 33.36% |
| Mineral Oil | 0.10% |
| Triethanolamine ($C_6H_{15}NO_3$) | 0.20% |
| Corrosion inhibitor | 0.10% |
| Thickening agent 1 - Polysaccharide gum | 0.41% |
| Fluorescent Pigment | 0.20% |
| Water | 65.64% |
| Total Weight of Final Diluted Product | 100% |

In Example 4, the final diluted product 202 is a medium viscosity long term fire retardant. The viscosity of the final diluted product 202 of Example 4 may be in the range of 400-550 cPs, for example 450-500 cPs. The viscosity was measured after mixing for 4 minutes at 10,000 rpm and using a rotational viscometer at 60 rpm. Alternatively, in Example 4, the final diluted product 202 may be a low viscosity long term fire retardant in the range of 150-400 cP by adjusting the amount of thickening agent 1 in the Example 4 composition 200. For example, the weight percent of the thickening agent 1 in the Example 4 final diluted product 202 may be about 0.2% to about 0.25% for a low viscosity long term fire retardant. The specific gravity of the final diluted product 202 of Example 4 may be in the range of about 0.8 g/mL to about 1.2 g/mL, for example about 1.0 g/mL to about 1.1 g/mL. The pH of the final diluted product 202 of Example 4 may be in the range of about 7.0 to about 8.0, for example about 7.5.

Example 5

In Example 5, a final diluted product 202 is prepared containing the amounts of ingredients listed in Table 10 below. The values in Table 10 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 10

Final Diluted Product according to Example 5

| Ingredient | Weight Percent of Each Ingredient in Final Diluted Product |
|---|---|
| 30% $MgSO_4$ Brine | 33.36% |
| Mineral Oil | 0.10% |
| Triethanolamine ($C_6H_{15}NO_3$) | 0.20% |
| Corrosion inhibitor | 0.10% |
| Thickening agent 1 - Polysaccharide gum | 0.41% |
| Fluorescent Pigment | 0.20% |
| Water | 65.64% |
| Total Weight of Final Diluted Product | 100% |

In Example 5, the final diluted product 202 is a medium viscosity long term fire retardant. The viscosity of the final diluted product 202 of Example 5 may be in the range of 350-500 cPs, for example 400-475 cPs. The viscosity was measured after mixing for 4 minutes at 10,000 rpm and using a rotational viscometer at 60 rpm. Alternatively, an Example 5 final diluted product 202 may be a low viscosity long term fire retardant in the range of 150-400 cP by adjusting the amount of thickening agent 1 in the Example 5 composition 200. For example, the weight percent of the thickening agent 1 in the Example 5 final diluted product 202 may be about 0.2% to about 0.25% for a low viscosity long term fire retardant. The specific gravity of the final diluted product 202 of Example 5 may be in the range of about 0.8 g/mL to about 1.2 g/mL, for example about 1.0 g/mL to about 1.1 g/mL. The pH of the final diluted product 202 of Example 5 may be in the range of about 7.0 to about 8.0, for example about 7.5.

Example 6

In Example 6, a dry concentrate is prepared containing the amounts of ingredients listed in Table 11 below. The values in Table 11 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 11

Dry Concentrate according to Example 6

| Ingredient | Weight Percent of Each Ingredient in Dry Concentrate |
|---|---|
| $MgSO_4(H_2O)$ | 70.33% |
| $MgCl_2$ | 20.39% |
| Mineral Oil | 0.83% |

TABLE 11-continued

Dry Concentrate according to Example 6

| Ingredient | Weight Percent of Each Ingredient in Dry Concentrate |
|---|---|
| Triethanolamine ($C_6H_{15}NO_3$) | 1.62% |
| Corrosion inhibitor | 0.83% |
| Thickening agent 1 - Polysaccharide gum | 3.33% |
| $TiO_2$ | 0.22% |
| Fluorescent Pigment | 1.62% |
| Water | 0.83% |
| Total Weight of Dry Concentrate | 100% |

In Example 6, the final diluted product 103 is prepared by mixing approximately 1.17 pounds of the dry concentrate in 1 gallon of water. The amounts of the ingredients in the Example 6 final diluted product 103 are listed in Table 12 below. The values in Table 12 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 6 final diluted product 103 is about 5% to 20% by weight in water, preferably about 6% to 18%, more preferably about 7% to 16%. For example, the weight percent of salt in the Example 6 final diluted product 103 is about 11%±1.0%.

TABLE 12

Final Diluted Product according to Example 6

| Ingredient | Weight Percent of Each Ingredient in Final Diluted Product |
|---|---|
| $MgSO_4(H_2O)$ | 8.62% |
| $MgCl_2$ | 2.50% |
| Mineral Oil | 0.10% |
| Triethanolamine ($C_6H_{15}NO_3$) | 0.20% |
| Corrosion inhibitor | 0.10% |
| Thickening agent 1 - Polysaccharide gum | 0.41% |
| $TiO_2$ | 0.03% |
| Fluorescent Pigment | 0.20% |
| Water | 87.84% |
| Total Weight of Final Diluted Product | 100% |

Example 7

In Example 7, a dry concentrate is prepared from a byproduct salt mixture made from the extraction of magnesium chloride from brine or sea water. The salts in the byproduct salt mixture may include, but are not limited to, the salts listed in Table 13 and any combinations thereof. For example, the salts in the byproduct salt mixture may include Kieserite ($MgSO_4(H_2O)_1$), Dipotassium Sulfate ($K_2SO_4$), Hexahydrite ($MgSO_4(H_2O)_6$), and Epsomite ($MgSO_4(H_2O)_7$). Alternatively, the salts in the byproduct salt mixture may include Kieserite ($MgSO_4(H_2O)_1$), Dipotassium Sulfate ($K_2SO_4$), Bischofite ($MgCl_2(H_2O)_6$), Magnesium Chloride ($MgCl_2$), Hexahydrite ($MgSO_4(H_2O)_6$), and Epsomite ($MgSO_4(H_2O)_7$). The values in Table 13 can be varied by ±0.01%, or ±0.05%, or ±0.1%, or ±0.5%, or ±1.0%, or +1.5%, or +2%, or ±2.5%, or ±3.0%, or ±3.5%, or ±4.0%, or ±4.5%, or ±5.0%.

TABLE 13

Byproduct salt mixture

| Salt Phase Name | Formula | Percent Composition of Each Salt in the Byproduct Salt Mixture |
| --- | --- | --- |
| Kieserite | $MgSO_4(H_2O)_1$ | 6.30% |
| Dipotassium Sulfate(VI) | $K_2SO_4$ | 4.40% |
| Bischofite, syn | $MgCl_2(H_2O)_6$ | 7.80% |
| Magnesium Chloride | $MgCl_2$ | 1.86% |
| Hexahydrite | $MgSO_4(H_2O)_6$ | 68.20% |
| Epsomite, syn | $MgSO_4(H_2O)_7$ | 11.40% |

In Example 7, a dry concentrate is prepared containing the amounts of ingredients listed in Table 14 below. The values in Table 14 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 14

Dry Concentrate according to Example 7

| Ingredient | Weight Percent of Each Ingredient in Dry Concentrate |
| --- | --- |
| Byproduct salt mixture | 94.08% |
| Mineral Oil | 0.53% |
| Triethanolamine ($C_6H_{15}NO_3$) | 1.03% |
| Corrosion inhibitor | 0.53% |
| Thickening agent 1 - Polysaccharide gum | 2.13% |
| $TiO_2$ | 0.14% |
| Fluorescent Pigment | 1.03% |
| Water | 0.53% |
| Total Weight of Dry Concentrate | 100% |

In Example 7, the final diluted product 103 is prepared by mixing approximately 1.98 pounds of the dry concentrate in 1 gallon of water. The amounts of the ingredients in the Example 7 final diluted product 103 are listed in Table 15 below. The values in Table 15 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 7 final diluted product 103 is about 5% to 20% by weight in water, preferably about 6% to 18%, more preferably about 7% to 16%. For example, the weight percent of salt in the Example 7 final diluted product 103 is about 10%±1.0%.

TABLE 15

Final Diluted Product according to Example 7

| Ingredient | Weight Percent of Each Ingredient in Final Diluted Product |
| --- | --- |
| Byproduct salt mixture | 18.08% |
| Mineral Oil | 0.10% |
| Triethanolamine ($C_6H_{15}NO_3$) | 0.20% |
| Corrosion inhibitor | 0.10% |
| Thickening agent 1 - Polysaccharide gum | 0.41% |
| $TiO_2$ | 0.03% |
| Fluorescent Pigment | 0.20% |
| Water | 80.89% |
| Total Weight of Final Diluted Product | 100% |

Example 8

In Example 8, a liquid concentrate is prepared from a byproduct salt mixture made from the extraction of magnesium chloride from brine or sea water. The salts in the byproduct salt mixture may include, but are not limited to, the salts listed in Table 13. The values in Table 13 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

In Example 8, a liquid concentrate is prepared containing the amounts of ingredients listed in Table 16 below. The values in Table 16 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%.

TABLE 16

Liquid Concentrate according to Example 8

| Ingredient | Weight Percent of Each Ingredient in Liquid Concentrate |
| --- | --- |
| 30% Byproduct salt mixture | 97.06% |
| Mineral Oil | 0.30% |
| Triethanolamine ($C_6H_{15}NO_3$) | 0.58% |
| Corrosion inhibitor | 0.30% |
| Thickening agent 1 - Polysaccharide gum | 1.19% |
| Fluorescent Pigment | 0.58% |
| Water | 0.00% |
| Total Weight of Dry Concentrate | 100% |

In Example 8, the final diluted product 103 is prepared by mixing approximately 2.91 pounds of the liquid concentrate in 1 gallon of water. The amounts of the ingredients in the Example 8 final diluted product 103 are listed in Table 17 below. The values in Table 17 can be varied by ±0.01%, or ±0.05%, or ±0.1%, or ±0.5%, or ±1.0%, or ±1.5%, or ±2%, or ±2.5%, or ±3.0%, or ±3.5%, or ±4.0%, or ±4.5%, or ±5.0%. The concentration of salt in the Example 8 final diluted product 103 is about 5% to 20% by weight in water, preferably about 6% to 18%, more preferably about 7% to 16%. For example, the weight percent of salt in the Example 8 final diluted product 103 is about 10%±1.0%.

TABLE 17

Final Diluted Product according to Example 8

| Ingredient | Weight Percent of Each Ingredient in Final Diluted Product |
| --- | --- |
| 30% Byproduct salt mixture | 33.36% |
| Mineral Oil | 0.10% |
| Triethanolamine ($C_6H_{15}NO_3$) | 0.20% |
| Corrosion inhibitor | 0.10% |
| Thickening agent 1 - Polysaccharide gum | 0.41% |
| Fluorescent Pigment | 0.20% |
| Water | 65.63% |
| Total Weight of Final Diluted Product | 100% |

Methods of Use

The forest fire retardant compositions of Examples 1-8 may be used to suppress, retard, or contain a forest fire. The forest fire retardant compositions of Examples 1-8 function as superior forest fire retardants compared to the PHOS-CHEK® brand long-term fire retardants (LTR) which use MAP and/or DAP and which have previously been qualified for use by the USFS. A list of the PHOS-CHEK® USFS Qualified long-term fire retardants is given in Table 18.

TABLE 18

List of PHOS-CHEK ® USFS Qualified LTR Products

| USFS Qualified LTR Products List | Description |
| --- | --- |
| PHOS-CHEK ® MVP-Fx | Dry Concentrate, Gum-Thickened, High and Medium Viscosity, High Visibility, Fugitive Color |
| PHOS-CHEK ® MVP-F | Dry Concentrate, Gum-Thickened, High and Medium Viscosity, Standard Fugitive Color |
| PHOS-CHEK ® P100-F | Dry Concentrate, Gum-Thickened, High and Medium Viscosity |
| PHOS-CHEK ® 259-Fx | Dry Concentrate, Gum-thickened, Low Viscosity, High Visibility, Fixed Tank Helicopter Powder Concentrate |
| PHOS-CHE ® 259-F | Dry Concentrate, Gum-thickened, Low Viscosity |
| PHOS-CHEK ® LC-95A-R | Wet Concentrate, Gum-Thickened, Low Viscosity |
| PHOS-CHEK ® LC-95A-Fx | Wet Concentrate, Gum-Thickened, Low Viscosity, High Visibility, Fugitive Color |
| PHOS-CHEK ® LC-95A-F | Wet Concentrate, Gum-Thickened, Low Viscosity |
| PHOS-CHEK ® LC-95-W | Wet Concentrate, Gum-Thickened, Low Viscosity, Red Iron Oxide, medium Viscosity Liquid Concentrate |

The forest fire retardant compositions of Examples 1-5 pull energy out of forest fires at they convert the hydrates of the hydrated salt to free water. When the dry concentrate 101 is mixed with water or when the salt is hydrated in the liquid concentrate 201, the salt will ionize and then the salt becomes hydrated when the dissolved concentration of ions exceeds the solubility of the salutation, at approximately 30% to 45% and more specifically at approximately 36% at ambient temps and pressure. Magnesium sulfate hydrate can form several hydrates. The hydrate may have the formula $MgSO_4(H_2O)_x$, where x is about 1 to about 11. Under heat, first the free water is driven off. Next, the water molecules of magnesium sulfate hydrate thermally dehydrate at progressively higher temperatures. The magnesium sulfate hydrate may be magnesium sulfate hexahydrate and/or magnesium sulfate heptahydrate or a combination of the two. The hydration state of magnesium sulfate hydrate may vary as a function of the humidity and temperature.

By contrast, the fire retardant ingredients in PHOS-CHEK® LTR products of Table 18 contain need to dry and require heat to produce a carbon coating that buffers the flammable vegetation from the fire's heat and slows the fire spread. Diammonium phosphate (DAP), an ingredient in PHOS-CHEK® LTR products, is semi-hygroscopic and does not absorb sufficient moisture from the air to form an aqueous solution. The critical relative humidity of DAP, a component in PHOS-CHEK® LTR products is 82%, an environmental situation that almost never occurs on a wildland fire, rendering its ability to pull moisture from the air meaningless. DAP is a man-made chemical produced in a factory. Further, the fire retardant ingredients in PHOS-CHEK® LTR products of Table 18 contain no water molecules. When cellulose fuels are burned in the presence of PHOS-CHEK® LTR products, hydrogen and oxygen both from the cellulose combine to form water. This requires that the fuel must already be burning for this water to form, thereby limiting the effectiveness of PHOS-CHEK® LTR products as a forest fire retardant.

When the product of Examples 1-5 is wet it functions as a fire retardant. Once the Once the final diluted composition 103 or 202 has dried after application, the magnesium sulfate of the composition effectively retards continued combustion. Magnesium sulfate interferes with the burning process through the release of inter gases (such as water vapor). At over 1124° F., the $MgSO_4$ compound dissociates into magnesium oxide (MgO) and sulfur trioxide ($SO_3$). In this process the propagating flame front is retarded through dilution of combustion gases, energy is absorbed reducing the temperature, and access to fuel reduced through the wall effect of oxide formation and charring.

By contrast, the PHOS-CHEK® LTR products of Table 18 need to dry and require heat to produce a carbon coating that buffers the flammable vegetation from the fire's heat and slows the fire spread. Diammonium phosphate (DAP), an ingredient in PHOS-CHEK® LTR products, is semi-hygroscopic and does not absorb sufficient moisture from the air to form an aqueous solution. The deliquescent relative humidity, also sometimes referred to as the critical relative humidity, of DAP, a component in PHOS-CHEK® LTR products is 82%, an environmental situation that almost never occurs on a wildland fire, rendering its ability to pull moisture from the air meaningless. DAP is a man-made chemical produced in a factory.

The forest fire retardant composition of Example 6 further contains magnesium chloride. Magnesium chloride is more hygroscopic than $MgSO_4$ and has a lower critical rehydration humidity, which allows it to re-hydrate when the ambient relative humidity is above 33%. The coordinated water in these rehydrated salts further pulls energy out of forest fires as it converts the coordinated water molecules in the hydrated salt to free water vapor. When the dry concentrate 101 is mixed with water or when the salt is hydrated in the liquid concentrate 201, the salt will ionize. The salt will become hydrated when the dissolved concentration of ions exceeds the solubility of the salutation, at approximately 30% to 45% and more specifically at approximately 36% at ambient temps and pressure. Because the salt contains magnesium, the most common hydrate is a hexahydrate. Magnesium chloride hexahydrate is deliquescent, absorbing sufficient moisture from the air to form an aqueous solution. The deliquescent relative humidity, also sometimes referred to as the critical relative humidity, of magnesium chloride hexahydrate is 33%, independent of temperature. Example 6 is also self-rehydrating. The larger the difference between the relative humidity of the atmosphere and the deliquescent relative humidity, also sometimes referred to as the critical relative humidity, the faster the water is rehydrated. Generally, the relative humidity on a wildland fire is lowest during the day and recovers during the night. In moderate burning condition, the nighttime relative humidity recovery will rise to 50%-70%. This is an environmental condition that exists often during wildfire season, thereby allowing magnesium chloride hexahydrate to absorb moisture from the air and pull it in to the fuel bed leading to its improved forest fire retardant capabilities. The forest fire retardant of Example 6 will start to recover water at a lower relative humidity and recover for a longer time every burning period. The magnesium chloride hexahydrate in the compositions of Example 6 contains six water molecules. Under heat, the six water molecules thermally dehydrate in pairs at progressively higher temperatures: 6 at 243° F., 4 at 358° F. and 2 at 572° F. The first water molecules are released at 243° F., which is above the temperature produced by solar heating, and below the ignition temperature of forest fuels. This progressive release of water molecules consumes heat, resulting in an endothermic compound that absorbs heat from the flame front. At over 1317° F., the $MgCl_2$ compound dissociates into magnesium and chloride ions.

The forest fire retardant composition of Examples 6 also relies on a vapor phase radical quenching process. The vapor phase inhibition aims to interrupt the radical gas phase of a fire. By disrupting the phase in which flammable gas is released the system is cooled and the supply of flammable gas is reduced or suppressed. Under heat attack from a wildland fire, but just below the temperature that forest fuels begin to actively burn (523° F.), the magnesium chloride compound in the compositions of Examples 1 and 3 dissociate, and the chloride ion separates from the magnesium to produce $Mg^{++}+2Cl^-$. The chloride atoms are released into the gas phase before the material reaches its ignition temperature. The chloride ion is very aggressive and will react with combustion radicals active in the rapid chain reaction that occurs just prior to active fire. The chloride ions quench the chemical reaction occurring within the flame and either extinguish the fire or slow the spread of the fire such that there is increased escape time or increased time to attempt other means of fire extinction. The chain reaction interference results in a diverted outcome of the combustion chain reaction and preventing the start of a fire. The chloride ion and six additional water molecules are present in the combustion atmosphere and are effective in retarding fire in the general fire area, not just on the coated fuels. In the PHOS-CHEK® LTR products, by contrast, the fire retardation occurs when the LTR produces a protective and insulating layer of carbon. The vegetation to be protected must be coated. Thus, effectiveness of PHOS-CHEK® LTR products is limited only to the fuels that are coated with the product.

The forest fire retardant compositions of Examples 7 and 8 further contain magnesium chloride and potassium sulfate and function as a superior fire retardant similar to the Examples of 1-6. The forest fire retardant compositions of Examples 7 and 8 utilize similar mechanisms of forest fighting as the Examples of 1-6 disclosed above. Thus, the forest fire retardant compositions of Examples 7 and 8 have potential use as a long-term fire retardants.

Direct Attack

In a direct attack, the final diluted composition 103 and/or 202 is applied on the flame front. The final diluted composition 103 and/or 202 is a thickened water retardant which contains water to cool and suppress the fire, and the dissolved salts can further enhance the effectiveness of these formulations through the mechanisms discussed above. For example, when the final diluted composition 103 and/or 202 includes magnesium chloride hexahydrate such as in Example 6, the water molecules of the magnesium chloride hexahydrate thermally dehydrate at 243° F., 358° F., and 572° F. in an endothermic reaction, diluting the combustion gasses with water vapor and absorbing heat from the fire as the reaction progresses and lowering the temperature of the flame front. At over 1317° F., the $MgCl_2$ compound dissociates into magnesium and chloride radicals. The hydrogen and chloride radicals interfere with the plasma reactions that occur during the fire by quickly reacting with and deactivating the hydrogen and hydroxyl combustion radicals. The magnesium radicals will react to form MgO, which is not flammable and can act as an insulator material to insulate fuels form the flame front. Fire is a rapid oxidation chain reaction and the combined mechanisms described above significantly retard the flame propagation.

Indirect Attack

In an indirect attack, the final diluted composition 103 and/or 202 is applied in fire containment lines at a significant distance from the fire line. The indirect fire lines are built, and the fire is allowed to burn into them. The long-term fire retardant must be effective even after the water in the composition has evaporated. The final diluted composition 103 and/or 202 of Example 6 is hygroscopic and self-rehydrating. In an indirect attack, the final diluted composition 103 and/or 202 is applied to vegetation. As the water in the final diluted composition 103 and/or 202 evaporates, the salt concentration increases until it reaches its saturation level. For example, when the final diluted composition 103 and/or 202 includes magnesium chloride hexahydrate, the saturation level is about 30% to 35% salt concentration, preferably about 31% to 34% salt concentration, and more preferably about 33% salt concentration. At the saturation level, hydrated $MgCl_2$—$(H_2O)_6$ forms which can act as a long-term fire retardant when exposed to the heat of the fire. When the flame front reaches vegetation treated with the final diluted composition 103, the hydrated water molecules cleave-off in pairs at 243° F., 358° F. and 572° F. in an endothermic reaction, absorbing heat from the fire as the reaction progresses and lowering the temperature of the flame front. The chloride ions will dissociate at 1317° F. and slow the combustion chain reaction process of the fire.

Field Handling and Measurement

The forest fire retardant composition of Examples 1-3 and 6-7 can be delivered to the field either as the dry concentrate 101, liquid concentrate 102 and/or 201, or as the final diluted composition 103 and/or 202. The forest fire retardant composition of Example 4 can be delivered to the field either as the liquid concentrate 201 or as the final diluted composition 202. The forest fire retardant composition of Example 5 can be delivered to the field as the final diluted composition 202. The final diluted compositions 103 and/or 202 of Examples 1-7 can be tested prior to application in the field to confirm proper salt content. For example, when the final diluted composition 103 and/or 202 includes magnesium sulfate, the magnesium sulfate yields between 8.0% and 15% salt by weight, and preferably about 10.0%±2% salt by weight in the final diluted composition 103 and/or 202. A refractometer can be used to test the salt content. Density can also be used to determine the salt content.

Field Mixing Procedures and Ratios

Batch preparation of final diluted composition 202 may be accomplished by slowly feeding the liquid concentrate into a well-stirred mix tank containing a predetermined amount of water. Mix tank agitation may be provided via an overhead mechanical stirring apparatus or alternatively by a circulation pump sized to provide turbulent mixing. Stir until the concentrate is uniformly mixed into the water. Alternatively, the final diluted composition 202 may be mixed using continuous mixing equipment.

Aerial Application

The final diluted composition 103 and/or 202 may be deposited via aerial application from an airplane or helicopter. The airplane may be a fixed-wing multi-engine aircraft, a fixed-wing single engine airtanker (SEAT), a large airtanker (LAT), a very large airtanker (VLAT), or an unmanned aircraft system (UAS). The helicopter may be a fixed-tank helicopter (HF) or it may be a helicopter bucket (HB). The final diluted composition 103 and/or 202 may be deposited in an indirect attack to build a retardant line before a forest fire or directly to a forest fire via aerial application.

Ground Application

The final diluted composition 103 and/or 202 may be deposited via ground application from a truck or ground engine (G). The final diluted composition 103 and/or 202 may be deposited in an indirect attack to build a retardant line before a forest fire or it may be deposited directly to a forest fire via ground application.

Clean Up Procedure

The dry concentrate 101 can be cleaned by broom and/or vacuum. The dry concentrate 101 should be kept dry during cleaning to minimize color staining that may occur when the dye is hydrated. When the dry concentrate 101 is exposed to water, the product can be cleaned with the use of a granular chemical absorbent material, or if proper drainage is available, by rinsing surfaces clean with adequate amounts of water. Dye coloration may be removed from surfaces by treatment with liquid or dry detergent. The final diluted composition 103 can be cleaned with soap or liquid detergent and water. The color of the dye can be neutralized by sodium hypochlorite or washed with liquid detergent.

The dry concentrate 101 can be cleaned by broom and/or vacuum. The dry concentrate 101 should be kept dry during cleaning to minimize color staining that may occur when the dye is hydrated. When the dry concentrate 101 is exposed to water, the product can be cleaned with the use of a granular chemical absorbent material, or if proper drainage is available, by rinsing surfaces clean with adequate amounts of water. Dye coloration may be removed from surfaces by treatment with liquid or dry detergent. The final diluted composition 103 can be cleaned with soap or liquid detergent and water. The color of the dye can be neutralized by sodium hypochlorite or washed with liquid detergent.

The liquid concentrate 201 can be cleaned by flushing with water and capturing the rinse in a tank or disposal container via drains. The liquid concentrate 201 and the final diluted composition 202 can be cleaned with soap or liquid detergent and water. The color of the dye can be neutralized by a bleaching agent such as sodium hypochlorite or washed with liquid detergent.

Corrosion Testing

Figure 5A:
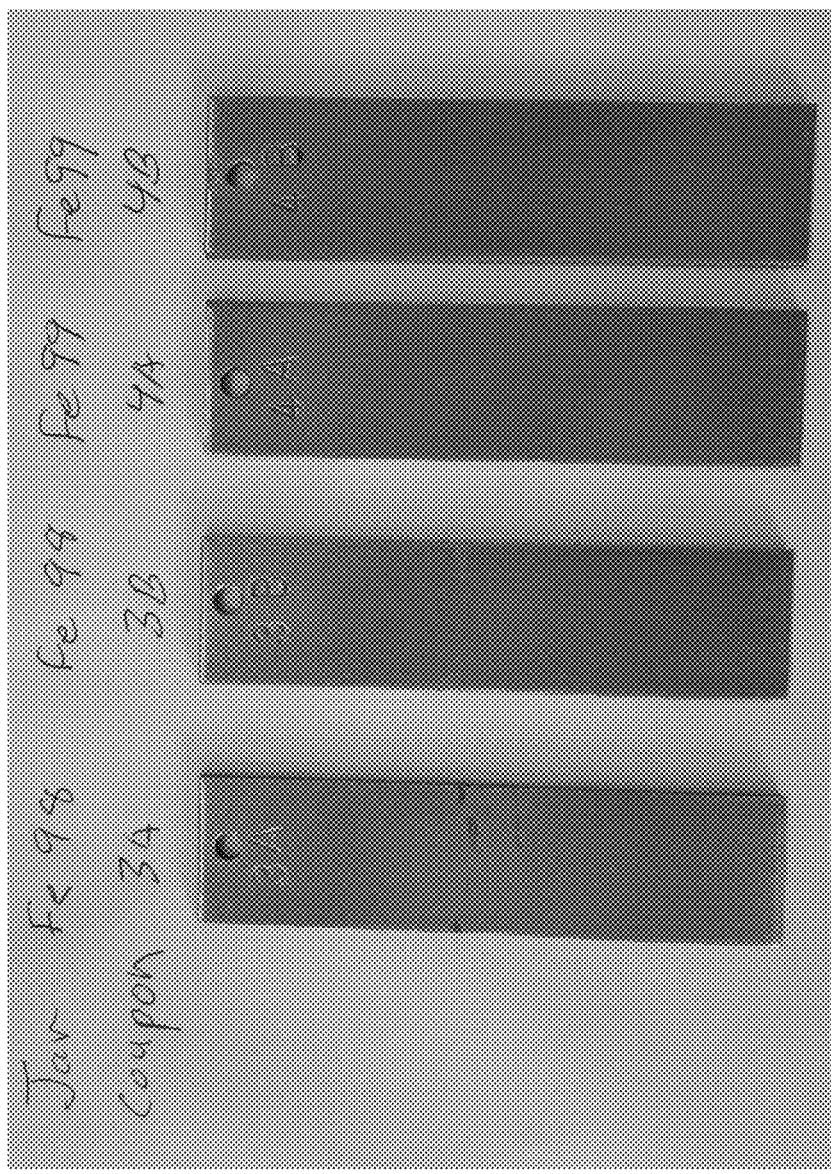
FIG. 5A shows a photograph of uniform corrosion of iron coupons in accordance with USFS Standard Test procedure LF-5.1 with Example 1.
Figure 5B:
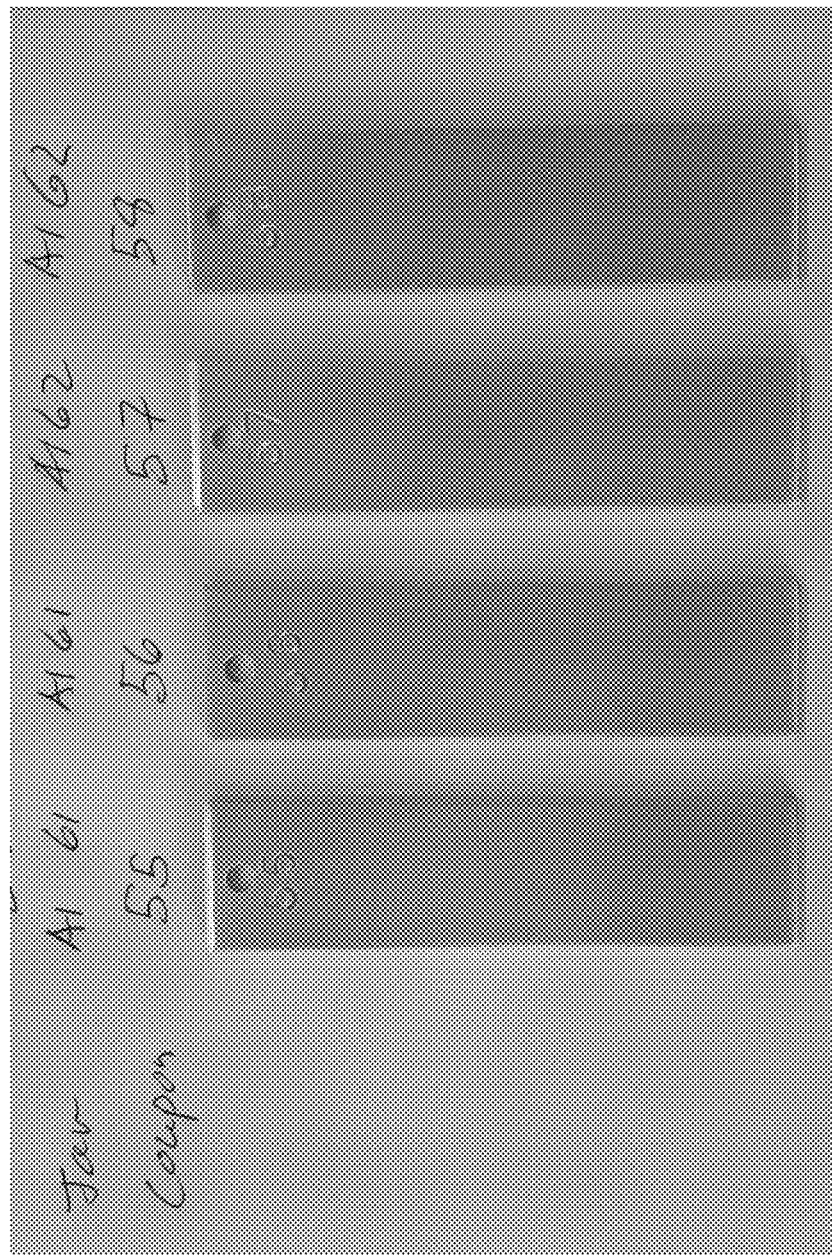
FIG. 5B shows a photograph of uniform corrosion of aluminum coupons in accordance with USFS Standard Test procedure LF-5.1 with Example 1.
Figure 5C:
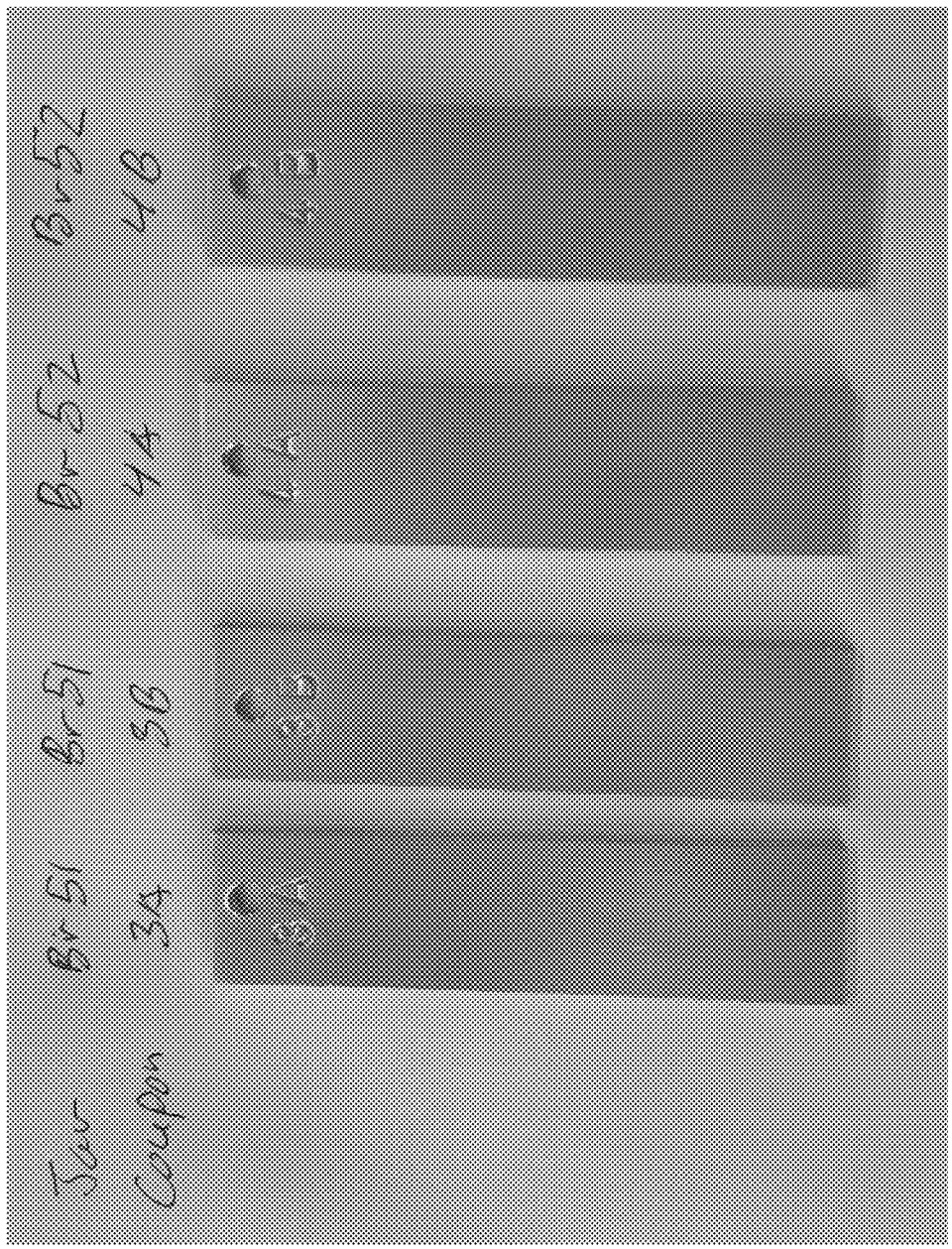
FIG. 5C shows a photograph of uniform corrosion of brass coupons in accordance with USFS Standard Test procedure LF-5.1 with Example 1.

The properties and corrosion inhibition of iron, brass, aluminum, and magnesium were tested according to the USFS "Laboratory Procedure LF-5.1, Uniform Corrosion Testing" and USFS "Test Method 5 (TM5-1) Corrosion Tests," hereby incorporated by reference in their entirety. Corrosion tests were performed using a metal test specimen with the dimensions of approximately 1 in×4 in×⅛ in (2.5 cm×10.2 cm×0.3 cm), made of 2024-T3 aluminum, 4130 steel, yellow brass, or Az31B magnesium for use in uniform corrosion testing. The coupons were fully immersed in full strength retardant concentration of Examples 1 and 7 for 90 days. The coupons were cleaned and measured in accordance with USFS Standard Test procedure. The corrosion results for Example 1 are shown in Table 19 and FIGS. 5A-5C.

TABLE 19

Uniform Corrosion Results of Example 1

| Metal | Coupon | Corrosion (mL/year) |
| --- | --- | --- |
| Iron | 3A | 0.466 |
| Iron | 3B | 0.372 |
| Iron | 4A | 0.184 |
| Iron | 4B | 0.177 |
| Aluminum | 55 | 0.179 |
| Aluminum | 56 | 0.167 |
| Aluminum | 57 | 0.164 |
| Aluminum | 58 | 0.182 |
| Brass | 3A | 0.212 |
| Brass | 3B | 0.169 |
| Brass | 4A | 0.178 |
| Brass | 4B | 0.188 |

Figure 6A:
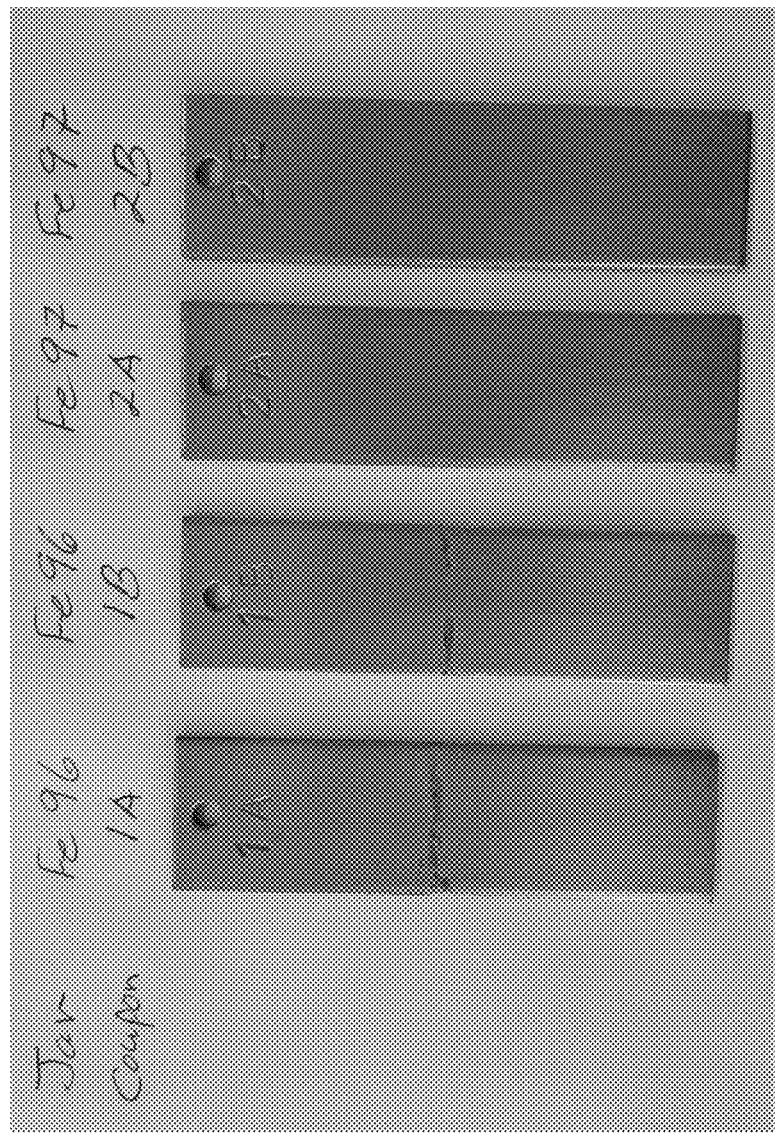
FIG. 6A shows a photograph of uniform corrosion of iron coupons in accordance with USFS Standard Test procedure LF-5.1 with Example 7.
Figure 6B:
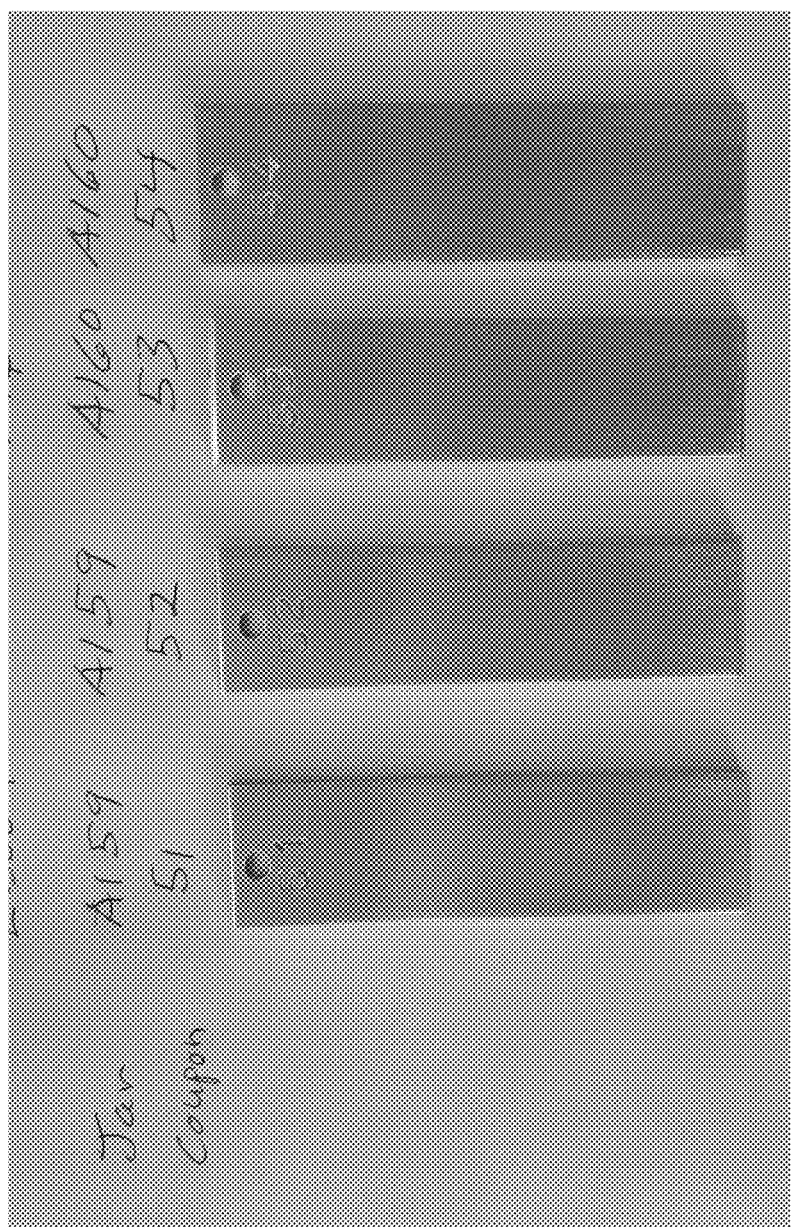
FIG. 6B shows a photograph of uniform corrosion of aluminum coupons in accordance with USFS Standard Test procedure LF-5.1 with Example 7.
Figure 6C:
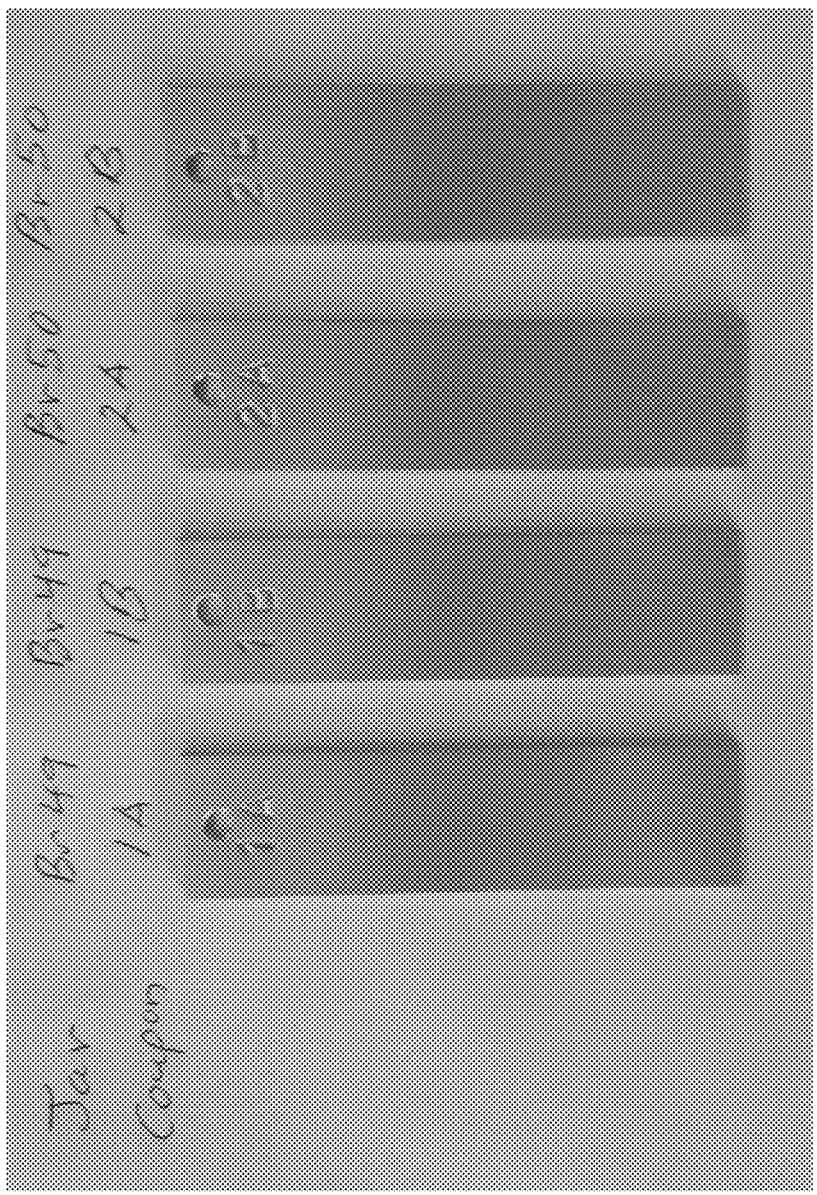
FIG. 6C shows a photograph of uniform corrosion of brass coupons in accordance with USFS Standard Test procedure LF-5.1 with Example 7.

The corrosion results for Example 7 are shown in Table 20 and FIGS. 6A-6C.

TABLE 20

Uniform Corrosion Results of Example 7

| Metal | Coupon | Corrosion (mL/year) |
| --- | --- | --- |
| Iron | 1A | 0.639 |
| Iron | 1B | 0.498 |
| Iron | 2A | 0.166 |
| Iron | 2B | 0.185 |
| Aluminum | 51 | 0.249 |
| Aluminum | 52 | 0.224 |
| Aluminum | 53 | 0.148 |
| Aluminum | 54 | 0.148 |
| Brass | 1A | 0.154 |
| Brass | 1B | 0.155 |
| Brass | 2A | 0.201 |
| Brass | 2B | 0.178 |

As shown in Tables 19 and 20 and FIGS. 5A-6C, the brass, iron, and aluminum coupons all showed corrosion rates of less than 5 mL/year, which is within the USFS approval threshold for general metallic corrosion rates.

Toxicity Testing

Rainbow Trout (Oncorhynchus mykiss), 53 days-post-hatch were exposed to the forest fire retardant composition of Example 1 for 96 (±2) hours following the procedures outlined in USDA Forest Service Standard Test Procedure STP-1.5—Fish Toxicity (available at http://www.fs.fed.us/rm/fire/wfcs/tests/stp01_5.htm) and the U.S. Environmental Protection Agency, Office of Prevention, Pesticides, and Toxic Substances. Fish Acute Toxicity Test, Freshwater and Marine; 850.1075, both incorporated herein by reference in its entirety. The fish were maintained in aerated aquaria containing EPA synthetic soft water at 12° C. for nine days prior to their use in this test. The $LC_{50}$ Acute Fish Toxicity Test rates the acute chemical toxicity to fish wherein the numeric value indicates the lethal concentration point at which the chemical results in 50% mortality of fingerling Rainbow Trout. The $LC_{50}$ values for the PHOS-CHEK® LTR products were derived from the US Forest Service's WFCS Fish Toxicity Test Results and/or Phos-chek's® product safety data sheets; Revised 2017-0906, incorporated herein by reference in its entirety. The $LC_{50}$ values for the dry concentrate 101 of Examples 1 and 7 were derived from the USFS 96-hour acute aquatic toxicity test (STP-1.5). The results are shown below in Table 21.

TABLE 21

LC$_{50}$ Acute Fish Toxicity Test

| Long Term Retardant Test Products | LTR Specific Product Number | LC$_{50}$ Test Results (mg/L) |
| --- | --- | --- |
| Dry concentrate 101 of Example 1 | FR-MSM | 3160 |
| Dry concentrate 101 of Example 7 | FR-WMR | 5120 |

| | | USFS Fish Toxicity Test Results Revised 2020-1005 | PHOS-CHEK ® SDS Results Revised 2020-1005 |
| --- | --- | --- | --- |
| PHOS-CHEK ® | MVP-Fx | 2,024 | 1183 |
| PHOS-CHEK ® | MVP-F | 2,454 | N/A |
| PHOS-CHEK ® | 259-Fx | 860 | 860 |
| PHOS-CHEK ® | LC95A-R | 386 | N/A |
| PHOS-CHEK ® | LC95A-Fx | 399 | 399 |
| PHOS-CHEK ® | LC95A-F | 225 | N/A |
| PHOS-CHEK ® | LC95W | 465 | 465 |

Combustion Retarding Effectiveness Testing

FIGS. 3A-3B show photographs of a burn table test with 10 wt % DAP (left) vs. 10 wt % MgSO$_4$ (right). Samples of 10 wt % DAP and 10 wt % MgSO$_4$ underwent burn table testing at coverage level 3 (3 gallons per hundred square feet (GPC)) over Ponderosa pine needles and Aspen excelsior. The results show that the 10 wt % MgSO$_4$ sample either replicated the effectiveness of 10 wt % DAP (as seen in FIG. 3B) or exhibited fire retarding effectiveness that exceeded the 10 wt % DAP control sample (as seen in FIG. 3A).

Figure 4:
FIG. 4 shows photographs of a burn table test with untreated (left) vs. 10.6 wt % DAP (middle) vs. Example 1 (right).

FIG. 4 shows photographs of a burn table test with untreated (left), 10.6 wt % DAP (middle), and Example 1 (right). The 10.6 wt % DAP and Example 1 beds were tested at coverage level 2 over Ponderosa pine and allowed to dry for approximately one week. A 25 gram plug of untreated aspen excelsior was inserted at the bottom end of the bed (approximately 1-1.25 inches diameter and the full width of the bed) and ignited with a torch. FIG. 4 was captured just after the untreated bed reached the end opposite from which was lit. The results show that the forest fire retardant of Example 1 exhibited fire retarding effectiveness that exceeded the 10.6 wt % DAP sample as shown in FIG. 4.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In the claims, as well as in the specification, any ingredient listed in an open-ended list of ingredients shall not be negated or avoided by the addition of water or other solvent or reactant that might cause a chemical change to such ingredient. Thus, for example, even though it is known that an anhydrous salt becomes hydrated in the presence of water, the inventors hereby act as their own lexicographers, so that any composition "including" or "comprising" an "anhydrous" salt is intended to cover both a dry composition substantially free of water in which the salt has substantially no water of hydration, as well as any wet composition formed by the addition of water which causes the anhydrous salt to become hydrated (or to undergo some other change). Both before and after the addition of water or other ingredient, the composition shall be regarded, for purposes of the specification and claims, as comprising an "anhydrous" salt irrespective of any hydration, solvation, or other change caused by the addition of water or other ingredient. The same applies for any ingredient recited in an open-ended list which might be chemically changed by the addition of water or other ingredient to the open-ended list.

The invention claimed is:

1. A method of combating a forest fire, the method comprising:
   depositing, via aerial or ground-based application, a forest fire retardant composition comprising:
     a retardant compound comprising Kieserite ($MgSO_4(H_2O)_1$), Dipotassium Sulfate ($K_2SO_4$), Hexahydrite ($MgSO_4(H_2O)_6$), and Epsomite ($MgSO_4(H_2O)_7$);
     a corrosion inhibitor for at least one of iron, brass, aluminum, or magnesium present in the composition in an amount having a weight percent of about 0.2% to about 6.0% relative to the weight of the retardant compound in the composition;
     a thickening agent, present in the composition in an amount having a weight percent of about 1.5% to about 6.5% relative to the weight of the retardant compound in the composition;
     a colorant, present in the composition in an amount having a weight percent of about 0.4% to about 3.5% relative to the weight of the retardant compound in the composition; and
     water;
   wherein the step of depositing comprises at least one of (a) a direct attack on the forest fire or (b) an indirect attack before the forest fire.

2. The method of claim 1, wherein the step of depositing is performed via aerial application from an airplane or helicopter.

3. The method of claim 1, wherein the step of depositing is performed via ground application from a truck.

4. The method of claim 1, wherein the forest fire retardant composition further comprises a pigment.

5. The method of claim 1, wherein the forest fire retardant composition further comprises a buffering agent.

6. The method of claim 1, wherein the forest fire retardant composition further comprises a mineral oil.

7. The method of claim 1, wherein the forest fire retardant composition further comprises a glow-in-the-dark additive.

8. The method of claim 1, wherein the forest fire retardant composition further comprises Bischofite ($MgCl_2(H_2O)_6$) and Magnesium Chloride ($MgCl_2$).

9. The method of claim 1, wherein the thickening agent comprises at least one of a polyurethane, a polyvinyl alcohol, an acrylic polymer, a gum, a cellulosic, a sulfonate, a saccharide, a clay, an organosilicone, or a protein.

10. The method of claim 9, wherein the thickening agent comprises the gum.

11. The method of claim 10, wherein the gum comprises a polysaccharide gum.

12. The method of claim 1, wherein the corrosion inhibitor comprises an alkyl amine and one or more azoles.

13. The method of claim 1, wherein the colorant comprises at least one of a red dye, an orange dye, a purple dye, a pink dye, Iron Oxide, Iron Oxide Black, or a fluorescent pigment.

14. The method of claim 13, wherein the colorant comprises the fluorescent pigment.

15. The method of claim 4, wherein the pigment is present in the composition in a weight percent of about 0.02% to about 2.0% relative to the weight of the retardant compound in the composition.

16. The method of claim 4, wherein the pigment comprises titanium dioxide.

17. The method of claim 4, wherein the pigment comprises iron oxide.

18. The method of claim 5, wherein the buffering agent is present in the composition in a weight percent of about 0.5% to about 5.0% relative to the weight of the retardant compound in the composition.

19. The method of claim 5, wherein the buffering agent comprises at least one of:
   triethanolamine ($C_6H_{15}NO_3$);
   diethanolamine;
   monoethanolamine; or
   monoethylene glycol.

20. The method of claim 1, wherein the forest fire retardant composition further comprises at least one of a spoilage inhibitor, a flow conditioner, an anti-foaming agent, a foaming agent, a stability additive, a biocide, a second thickening agent, a surfactant, an adjuvant, a second corrosion inhibitor, an opacifier, a second colorant, a liquid carrier, or a deduster.

* * * * *